United States Patent [19]

Noguchi et al.

[11] Patent Number: 5,108,833

[45] Date of Patent: Apr. 28, 1992

[54] POROUS STRUCTURAL UNIT AND A METHOD OF PREPARING THE SAME

[75] Inventors: Yoshihiro Noguchi; Toshihisa Imai; Yutaka Takahashi, all of Hanazono; Hideharu Tanaka, Amagasaki, all of Japan

[73] Assignees: Mitsubishi Denki Kabushiki Kaisha, Tokyo; Mitsubishi Electric Home Appliance Co., Ltd., Saitama, both of Japan

[21] Appl. No.: 429,496

[22] Filed: Oct. 31, 1989

[30] Foreign Application Priority Data

Oct. 31, 1988 [JP] Japan .................. 63-275688
Apr. 24, 1989 [JP] Japan .................. 1-104228
Apr. 28, 1989 [JP] Japan .................. 1-110996
Aug. 11, 1989 [JP] Japan .................. 1-208418

[51] Int. Cl.⁵ .................................. B32B 3/26
[52] U.S. Cl. .......................... 428/310.5; 181/290; 181/294; 428/317.9; 428/319.3; 428/319.7
[58] Field of Search ............. 428/310.5, 317.9, 319.3, 428/319.7; 181/290, 291, 293, 294

[56] References Cited

U.S. PATENT DOCUMENTS

| | | | |
|---|---|---|---|
| 3,262,834 | 7/1966 | Abell et al. | 428/317.9 |
| 3,709,774 | 1/1973 | Kimura | 428/310.5 |
| 3,718,532 | 2/1973 | Hayes, Jr. | 428/310.5 |
| 3,925,526 | 12/1975 | Haas | 428/310.5 |
| 4,037,013 | 7/1977 | Sprague | 428/317.9 |
| 4,304,810 | 12/1981 | Gates et al. | 428/316.6 |

FOREIGN PATENT DOCUMENTS

| | | |
|---|---|---|
| 53-113172 | 10/1978 | Japan . |
| 57-201633 | 12/1982 | Japan . |
| 58-52132 | 11/1983 | Japan . |
| 59-45134 | 3/1984 | Japan . |
| 61-263714 | 11/1986 | Japan . |
| 62-1045 | 1/1987 | Japan . |
| 2184400 | 6/1987 | United Kingdom . |
| 86/06393 | 11/1986 | World Int. Prop. O. . |

Primary Examiner—William J. Van Balen
Attorney, Agent, or Firm—Oblon, Spivak, McClelland, Maier & Neustadt

[57] ABSTRACT

The present invention concerns a method of preparing a porous structural unit comprising a plurality of layers having different specific gravities by pressing and heating a material including resin particles between opposing molds having a temperature difference to thereby cause the fusion or bonding of the resin particles, and a porous structural unit which improves acoustic absorption properties and heat insulation properties and in which the specific gravity is continuously changed.

7 Claims, 13 Drawing Sheets

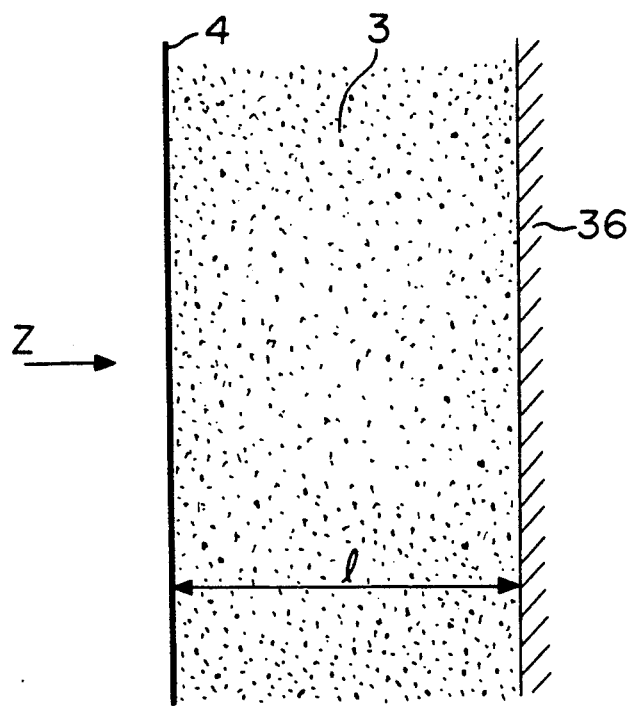
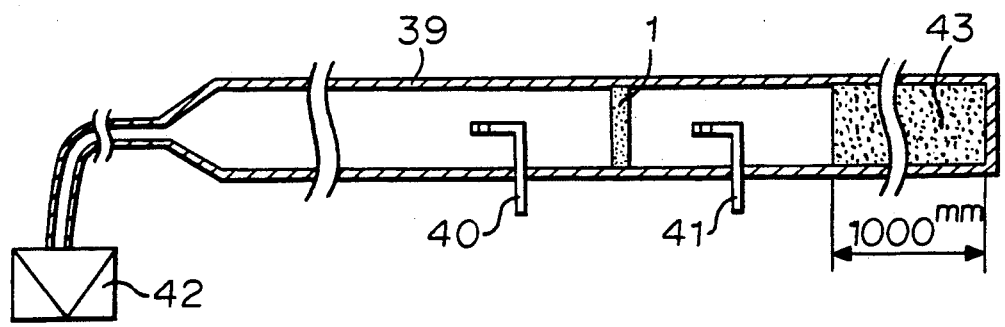

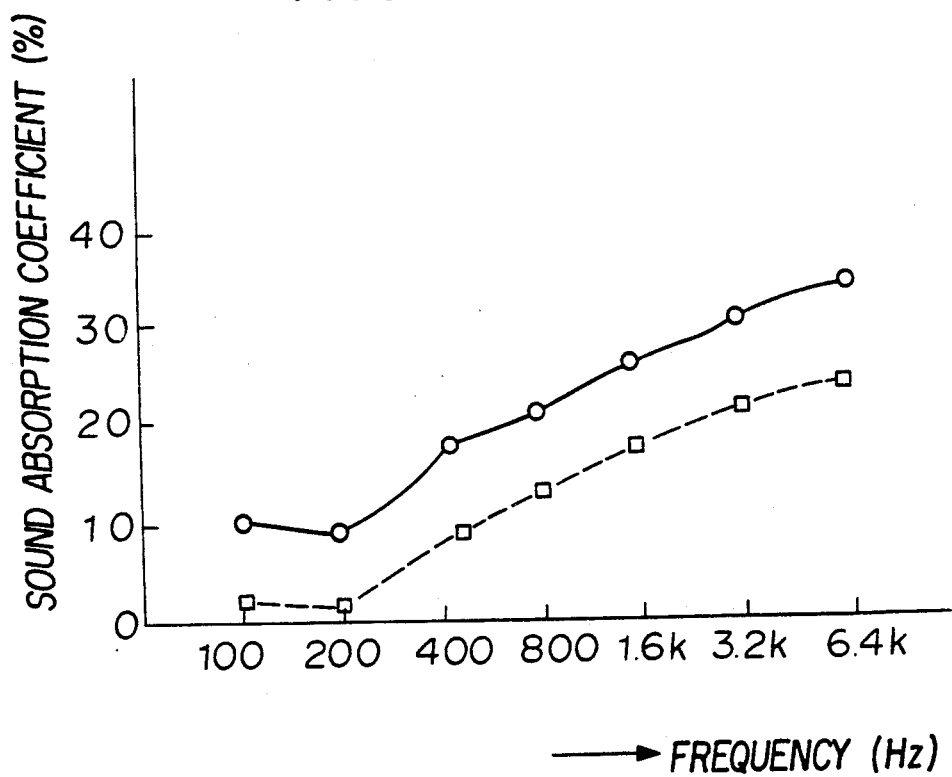

POROUS STRUCTURAL UNIT AND A METHOD OF PREPARING THE SAME

BACKGROUND OF THE INVENTION

The present invention relates to a porous structural unit used for an acoustic absorption material or a heat insulation material. More particularly, it relates to a porous structural unit having a porous layer wherein the specific gravity is continuously changed in the direction of the thickness of the layer or of the surface of the layer, and a method of preparing the same.

There have been used as an acoustic absorption material or a heat insulation material a porous material such as glass wool, rock wool, urethane foam and so on. The porous material such as urethane foam, steel wool and so on have been used as a filter for cleaning air. The porous material is widely used for the purpose of sound deadening, heat insulating and air cleaning such as a vacuum cleaner, a cooling/warming air conditioner, an air cleaner and so on. There is a strong demand from manufacturers that the porous material be low cost and high in performance as well as the minimum restrictive conditions (e.g. the shape be small). Generally, an acoustic absorption material or an heat insulation material is so constructed that an inner lining is attached to a structural body made of a non-gas-permeable material. The structural body has functions to shield sounds and to form a part of a flow passage for air. A filter unit is formed by assembling a porous material in a frame of a non-gas-permeable material. The frame has a sealing effect so as not to cause leakage of a fluid from the periphery of the porous material in the filter unit. The porous material and the non-gas-permeable material can be prepared separately and then assembled. Or, the porous material is formed by using a foaming material and then, a part of the surface of the porous material is processed to have non-gas-permeability.

The above-mentioned porous structural unit and the method of preparing of the unit are disclosed in, for example, Japanese Unexamined Patent Publication 113172/1978 "vacuum cleaner", Japanese Examined Patent Publication 52132/1983 "indoor unit of air conditioner", Japanese Unexamined Patent Publication 1045/1971 "multi-cellular thermoplastic material, a complex consisting of said material and a thermoplastic sheet layer, and a method of preparing the same" and Japanese Unexamined Patent Publication 19654/1973 "process for forming a laminated soft outer layer".

In the conventional method of preparing a porous structural unit, there were problems that a combination of the porous layer and a layer (e.g. a non-gas-permeable layer) having a higher specific gravity required much cost; the method of using a foaming material required additional cost because a side surface had to be made non-gas-permeable, and it was difficult to obtain a complicated configuration.

Further, the conventional porous structural unit had problems that since it had a simple shape wherein the porous layer having a uniform specific gravity and a layer (e.g. a non-gas-permeable layer) having a higher specific gravity were combined, it was difficult to give the optimum distribution of specific gravity and give the optimum shape in order to further increase the performance, and it was difficult to obtain good sound absorption characteristic and good heat insulation characteristic.

SUMMARY OF THE INVENTION

An object of the present invention is to eliminate the above-mentioned problems. The first invention is to provide a method of preparing a porous structural unit wherein a material including resin particles is used as a raw material, and a layer (such as a non-gas-permeable layer) having a higher specific gravity and a porous layer having lower specific gravity are simultaneously formed in one piece.

The first method of preparing a porous structural unit according to the first invention is characterized by comprising a step of putting a material including resin particles into a space formed by first and second molds, a step of producing a temperature difference between the first and second molds, a step of pressing the material with the molds, and a step of heating at least one of the molds to a temperature sufficient to soften the resin particles in the material, whereby a layer having a higher specific gravity produced at the high temperature side of the molds and a porous layer having a lower specific gravity produced at the low temperature side are formed in one piece. Accordingly, the material at the high temperature side is molten or softened by heat at the high temperature side of the mold and a pressure between the first and second molds so that a layer having a higher specific gravity (e.g. a fusion layer) is formed, and on the other and, at the low temperature side, the resin particles are molten or bonded to each other in a semi-fluid state so that a porous layer having a lower specific gravity is formed. At the same time, the both layers are melt-bonded or attached to each other in one piece. Thus, the above-mentioned porous structural unit is formed.

In the second method of preparing a porous structural unit according to the first invention, the material including resin particles which is the same material as used in the first method is heated and then, is pressed or is subjected to a shearing stress, whereby the material at the high temperature side is deformed at its surface portion by compression and the fusion is accelerated to thereby increase the specific gravity.

The second invention is to provide a porous structural unit with a porous layer in which there are portions having different specific gravities, whereby acoustic absorption characteristic and heat insulation characteristic can be increased, and it is possible to use the unit in a wide range.

In accordance with the porous structural unit of the second invention, it has a porous layer in which the specific gravity is continuously changed in the direction of the thickness of the layer or of the surface of the layer. Accordingly, the acoustic absorption characteristic can be increased and the heat insulation characteristic with respect to radiation and heat conduction can be increased.

BRIEF DESCRIPTION OF THE DRAWINGS

In drawings:

FIG. 25 is a diagram in a form of acoustic model of a porous structural unit to illustrate the effect of the skin layer;

FIG. 29 is a diagram showing a device for measuring sound shielding characteristic; and FIG. 30 is a diagram showing the sound shielding characteristic curves of two-porous structural units according to the second invention.

DETAILED DESCRIPTION OF THE PREFERRED EMBODIMENTS

Example of the porous structural unit of the second invention

An embodiment of the porous structural unit according to the second invention will be described.

Figure 1:
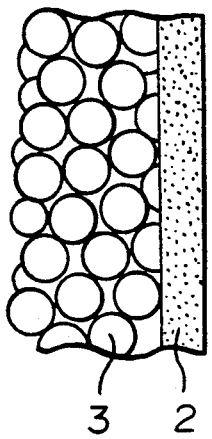
FIGS. 1 and 2 are respectively cross-sectional views of porous structural units prepared by the method of the first invention.
Figure 2:
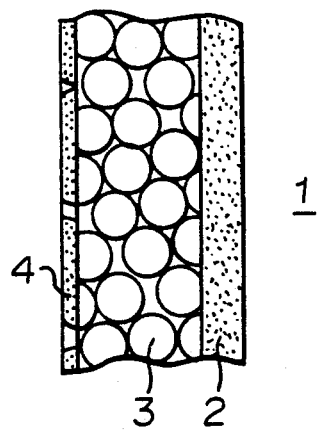

FIGS. 1 and 2 are respectively diagrams in a form of model which show cross-sectioned views taken in the direction of the thickness of the porous structural unit according to an embodiment of the second invention. In FIGS. 1 and 2, a reference numeral 2 designates a layer having a higher specific gravity, such as a fusion layer which may be of gas-permeable or non-gas-permeable, a numeral 3 designates a porous layer having a lower specific gravity which is generally of gas-permeable. The porous layer is so formed that the porosity is continuously changed in the direction of the thickness. A numeral 4 designates a skin layer having a specific gravity between those of the layers 2 and 3. The skin layer is a fusion layer having a thickness of, for instance, 100 μm or less. In the porous structural unit 1, the fusion layer 2 and the porous layer 3 are integrally formed. Similarly, the fusion layer 2, the porous layer 3 and the skin layer 4 are integrally formed.

When the porous structural unit 1 is used as a sound absorption material, the porous layer 3 is opposed to the side of a source of noise whereby the energy of sound is absorbed and attenuated and sonic waves are prevented from passing through the fusion layer 2.

Figure 3:
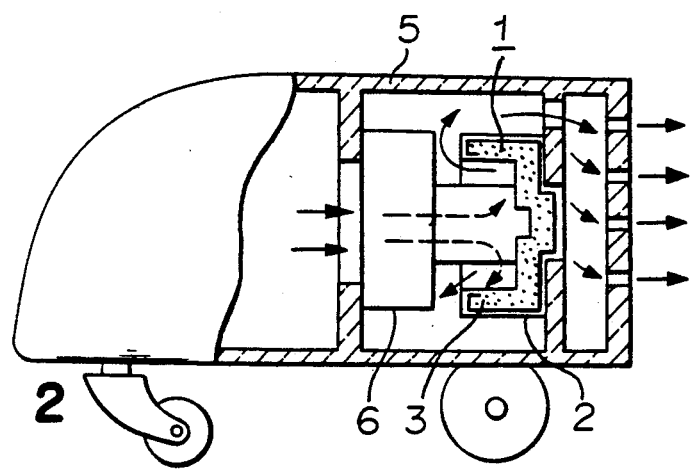
FIG. 3 is a longitudinal cross-sectional view of an important portion of a vacuum cleaner in which the porous structural unit as shown in FIG. 1 is used as a sound absorption material.

FIG. 3 is a cross-sectional view of an important part which shows the porous structural unit 1 is used as a sound absorption material for a vacuum cleaner. In FIG. 3, a reference numeral 5 designates an outer frame and a numeral 6 is a blower motor as a source of noise. The porous structural unit 1 as a sound absorption material is formed to surround the air discharge side of the blower motor 6 wherein the porous layer 3 faces the blower motor 6 and the fusion layer 2 faces the outside. In FIG. 3, arrow marks indicate flows of air stream in the actuation of the vacuum cleaner. With the above-mentioned construction, noises produced from the blower motor 6 can be absorbed and interrupted by the porous structural unit 1 as a sound absorption material.

Method of preparing the porous structural unit of the first invention

A method of preparing a porous structural unit in which the density is continuously changed in the direction of the thickness of the layer or the surface of the layer, and the characteristics of the porous structural unit will be described.

Figure 4:
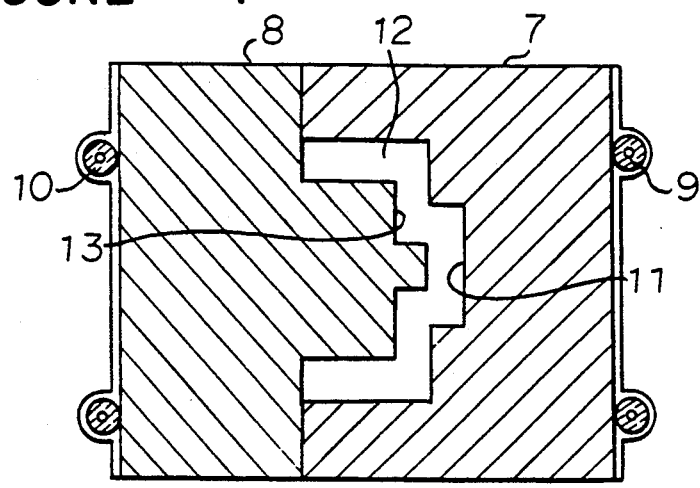
FIG. 4 is a cross-sectional view of a metal mold for explaining the method according to the first invention.

FIG. 4 is a cross-sectional view of a metal mold which is used for preparing the porous structural unit as shown in FIG. 3. In FIG. 4, a reference numeral 7 designates a recessed metal mold half made of a material having good heat conduction such as aluminum. A numeral 8 designates a projecting metal mold half which is also made of aluminum. Numeral 9, 10 designate heaters for elevating temperature for each of the metal mold halves wherein the recessed metal mold half 7 is heated at a higher temperature than the projecting metal mold half 8.

EXAMPLE 1-1 of the method of preparing a porous structural unit

Description will be made as to forming the porous structural unit by using a granular material of thermoplastic resin.

The temperature of a wall portion 11 of the recessed metal mold half 7 is set at a temperature higher than that softening the granular material as a raw material put in a closed space 12 formed by the recessed metal mold half 7 and the projecting metal mold half 8 but lower than the temperature causing thermal decomposition, usually at a temperature in a range of 150°–240° C. The temperature of a wall portion 13 in the projecting metal mold half 8 is set at a temperature lower than the temperature of the wall portion 11 of the recessed metal mold half 7, for instance at or near a temperature softening the granular material as the raw material, usually at 70°–180° C. Then, a granular material (of a diameter of about 0.2-3 mm) of a thermoplastic resin such as ABS resin (acrylonitrile-butadiene-styrene resin having a softening temperature of 80°–90° C.) is put into the space between the metal mold halves 7, and then the metal mold halves are closed while applying a pressure and heat is applied for several tens seconds–several hours. The heating is carried out at the set temperature for the metal mold halves 7, 8 and a pressure is applied at 1 kg/cm²–several tons/cm² while applying heat.

The granular material in contact with the wall portion 11 heated at a higher temperature of the recessed metal mold half 7 is melted so that a layer having a higher specific gravity, i.e. a fusion layer 2, is finally produced. The change of granular material from a gas-permeable state to s non-gas-permeable state depends on a degree of fusion. Since the temperature of the wall portion 13 of the projecting metal mold half 8 is lower than that of the wall portion 11, the granular material filled in the portion from the wall portion 13 to the fusion layer 2 does not reach the complete fluid state. However, particles of the granular material are melt-bonded at their contacting portions, and finally, a porous layer 3 melt-bonded to the fusion layer 2 is produced. Although the porous layer 3 is normally gas-permeable, it becomes a non-gas-permeable state by mixing a material such as a binder.

Thus, the layer having a higher specific gravity and the porous layer having a lower specific gravity can be simultaneously and integrally produced.

According to experiments; it was found that a desired temperature difference was 10° C. or higher in order to obtain the complete melting state or a semi-fluid state under the condition that the temperature of the wall portion 11 of the recessed metal mold half 7 and the temperature of wall portion 13 of the projecting metal mold half 8 are set to be constant.

When the temperature of the wall portion 11 of the recessed metal mold 7 is 150° C. or lower, it is difficult to obtain the fusing state of the granular material, and on the other hand, when it is 240° C. or higher, the melting state is too excessive whereby it is difficult to obtain a multi-layered structure. When the temperature of the wall portion 13 of the recessed metal mold half 8 is 70° C. or lower, a melt-bonding state of the particles at their contacting portions does not occur and it is difficult to melt-bond to each other. When it is 180° C. or higher, the melting state of the granular material goes too far and it is difficult to form a porous layer.

When the diameter of the granular material, i.e. resin particles is 0.2 mm or less, the porosity is too small so that the function of the porous structural unit, e.g. acoustic absorption characteristic, heat insulation characteristic and so on is reduced. When the diameter is 3 mm or more, the acoustic absorption characteristic is reduced although the heat insulating characteristic can be improved.

When a pressure applied by the metal mold is 1 kg per cm² or less, melt-bonding of the granular material becomes unstable. On the other hand, the pressure is several tons/cm² or more, it is difficult to keep accuracy in controlling temperature, and processability is reduced.

When the granular material is heated by the metal mold for several tens seconds or less, the melt-bonding state becomes insufficient. On the other hand, when the heating time reaches several hours, the melting state goes too far and the boundary between the fusion layer and the porous layer becomes unclear to thereby deteriorate the characteristics.

The thickness and the degree of gas-permeability (in a range from gas-permeability to non-gas-permeability) of the fusion layer to be formed are changed by changing a heating temperature and a heating time. Accordingly, a desired characteristic can be obtained by selecting the conditions in order to obtain a desired porous structural unit.

EXAMPLE 1-2 of the method of preparing a porous structural unit

Figure 5:
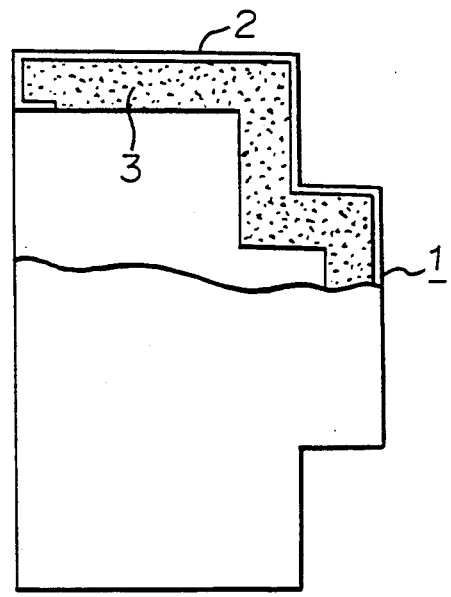
FIG. 5 is a side view partly cross-sectioned of the porous structural unit prepared by using the mold shown in FIG. 4.

In the above-mentioned Example 1-1, the temperature of the wall portion 11 of the recessed metal mold half 7 was set to 150° C., and the temperature of the wall portion 13 of the projecting metal mold half 8 was set to 100° C. As an ABS resin, spherical particles having a diameter of 1 mm which is a granular material of thermoplastic resin having a softening temperature of 86° C. (GTR-40 (grade) manufactured by Denki Kagaku Kabushiki Kaisha)) were put in the metal mold, and then the metal mold halves 7, 8 were closed. The distance between the wall surfaces 11, 13 was 10 mm. After the metal mold was heated for 20 minutes, the metal mold halves 7, 8 were opened. A pressure applied to the metal mold while heating was 100 kg/cm². Thus obtained porous structural unit 1 is shown in FIG. 5. The thickness of the porous structural unit was 10 mm; the thickness of the fusion layer 2 was about 1 mm, and the thickness of the porous layer 3 was about 9 mm.

EXAMPLE 1-3 of the method of preparing a porous structural unit

In the above-mentioned Example 1-1, the temperature of the wall portion 11 of the recessed metal mold half 7 was set to 180° C., and the temperature of the wall portion 13 of the projecting metal mold half 8 was set to 130° C. As an ABS resin, spherical particles having a diameter of 1 mm which is a granular material of thermoplastic resin having a softening temperature of 86° C. (GTR-40 (grade) manufactured by Denki Kagaku Kabushiki Kaisha)) were put in the metal mold, and the metal mold halves 7, 8 were closed. The distance between the wall surfaces 11, 13 was 10 mm. In this state, the metal mold halves 7, 8 were opened after 15 minutes have passed. A pressure applied to the metal mold under the condition of heating was 100 kg/cm². The thickness of thus formed porous structural unit 1 was 10 mm, the thickness of the fusion layer 2 was about 1 mm and the thickness of the porous layer 3 was about 9 mm. In comparing the porous structural unit of the Example 1-2, it was found that the fusion of the surface of the porous layer 3 is partly accelerated and a skin layer of about 30 μm was formed.

As the granular material of thermoplastic resin, PP (polypropylene), AS (acryl styrol), styrol and so on may be used. As a binder to be mixed with the granular material of thermoplastic resin, methyl-ethyl-ketone (MEK), cellulose, varnish, acetone may be used. The bonding strength of the granular material of the porous structural unit is increased and the mechanical strength is increased by spraying or mixing the above-mentioned binder to the granular material. In the above-mentioned Examples 1-1, 1-2 and 1-3, the raw material was put under the condition that the temperatures of the wall portions 11, 13 of the high temperature and low temperature metal mold halves 7, 8 were maintained constant. However, there may be used for such a method that a raw material is put in the metal mold having the room temperature and the temperature of metal mold is increased to a predetermined temperature during which a mold-shaped product is removed. In such method, a porous structural unit having the same quality can be obtained. Experiments revealed that the temperature difference between the high temperature and low temperature metal mold halves could be small, for instance 2° C. Of course, the temperature difference varied depending on conditions, e.g., a material to be used, the size and the shape of the material, a rate of raising temperature in the metal mold halves, a pressure applied to the metal mold halves and so on.

Figure 6:
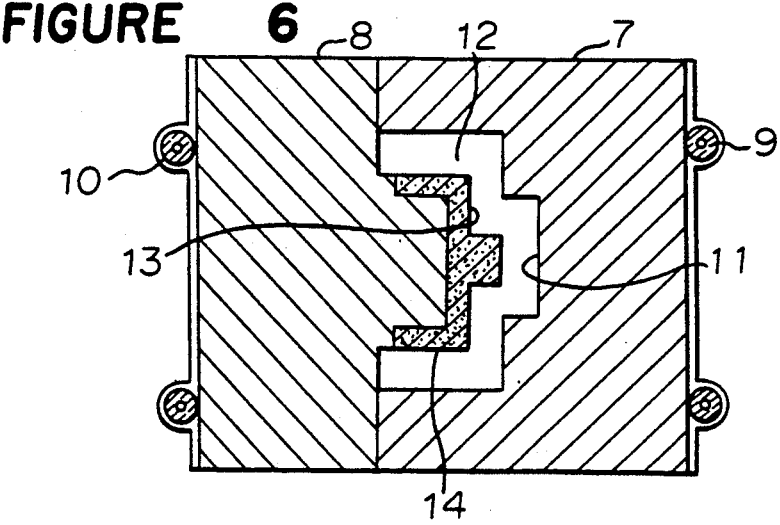
FIG. 6 is a cross-sectional view of a metal mold used for another method according to the first invention.

In order to form a temperature difference between the wall portion 11 of the recessed metal mold half 7 and the wall portion 13 of the projecting metal mold half 8, the wall portion 13 of the projecting metal mold half 8 may be formed of a material 14 which is a low heat conductive material such as PBT (polybutylene terephthalate) resin, FRP (fiber reinforced plastics) or the like as shown in FIG. 6. The size of the metal mold halves 7, 8 can be different although the material is the same. In short, it is sufficient that a predetermined temperature difference can be temporarily or constantly given to the metal mold halves 7, 8 by selecting suitably the heat capacity of the mold halves and the calorie of the heaters which depend on the kind and the size of the 20 material used.

EXAMPLE 2-1 of the method of preparing a porous structural unit

A case of forming the porous structural unit by using the granular material of thermoplastic resin will be described. In the same manner as the Example 1-1, the temperature of wall portion 11 of the recessed metal mold half 7 was set to a temperature higher than that for softening the granular material but lower than the thermal decomposition temperature. The temperature of the wall portion 13 of the projecting metal mold half 8 was around a temperature at which the granular material is softened and which is lower than the temperature of the wall portion 11 of the recessed metal mold half 7.

Then, particles having a diameter of about 0.2–3 mm as a granular material of thermosetting resin such as phenol, PBT (polybutylene terephthalate), PET (polyethylene terephethalate) or the like were put in the metal mold halves 7, 8 together with a binder such as cellulose, varnish and various adhesives in a mixed state. The metal mold halves 7, 8 were closed while applying a pressure, and were heated for several minutes –several hours. Heating operations were carried out at the above-mentioned set temperature for the metal mold halves 7, 8, and a pressure applied thereto was 1 kg /cm² several tons/cm² under the condition of heating.

Then, the granular material in contact with the wall portion 11 heated at a higher temperature of the recessed metal mold half 7 was softened and was melt-bonded to each other by the binder so that it became a layer having a higher specific gravity. The layer changes from a gas-permeable state to a non-gas-permeable state depending on a degree of the softening of the granular material. Since the temperature of the wall portion 13 of the projecting metal mold half 8 is lower than that of the wall portion 11, the granular material filled in the area from the wall portion 13 to the higher specific gravity layer 12 does not become the complete fluid state. However, the particles are bonded to each other by the binder at their contacting portions and finally, the porous layer 3 bonded to the higher specific gravity layer 2 is formed in one piece. Although the porous layer 3 is normally gas-permeable, it exhibits non-gas-permeability when a large amount of the binder is mixed therewith.

EXAMPLE 2-2 of the method of preparing a porous structural unit

In the above-mentioned Example 2-1, the temperature of the wall portion 11 of the recessed metal mold half 7 was set at 200° C., and the temperature of the wall portion 13 of the projecting metal mold half 8 was set at 150° C. As a thermosetting resin, particles having a diameter of 1 mm of phenol resin (having a softening temperature of 190° C., MW-752 (grade) manufactured by Meiwa Kasei Kabushiki Kaisha) were put in the mold together with 15 wt % of powder cellulose as a binder. Then, the metal mold halves 7, 8 were closed. The distance between the wall surfaces 11, 13 was 10 mm. In this state, the heating operations were maintained for 25 minutes, and then the metal mold halves 7, 8 were opened. A pressure applied to the metal mold halves under the condition of heating was 150 kg/cm². The thickness of the porous layer thus formed was 10 mm, the thickness of the layer having a higher specific gravity was about 1 mm, and the thickness of the porous layer 3 was about 9 mm. A granular material obtained by coating a thermosetting resin with a thermoplastic resin may be used.

EXAMPLE 3-1 of the method of preparing a porous structural unit

A case that the porous structural unit is formed by using a material including particles other than the above-mentioned resin particles will be described.

Figure 7:
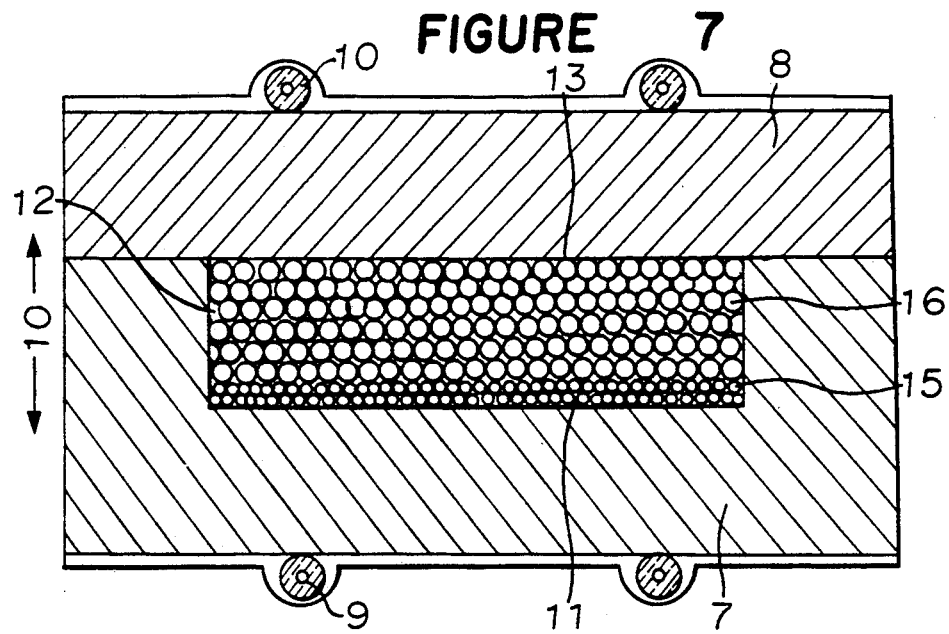
FIG. 7 is a cross-sectional view of a metal mold for explaining a method of preparing a porous structural unit containing iron particles according to the first invention.

FIG. 7 is a cross-sectional view of metal mold halves 7, 8 in a closed state wherein a material including two kinds of particles are filled in the space 12 formed by the metal mold halves.

First, iron particles 15 having a longer diameter of about 0.2 mm was filled in the recessed metal mold half 7 so that the thickness of the iron particle layer is about 1 mm. Then, ABS resin particles 16 having a longer diameter of about 1 mm (which is the same as that used in Example 1-2 of the method of preparing the porous structural unit) were filled so that the thickness of the ABS resin layer is about 2 mm higher than the height (10 mm) of the closed space 12. The projecting metal mold half 8 (FIG. 7 shows a flat metal mold half) was assembled in a close-contact state to the recessed metal mold half 7, whereby the layers of the iron particles 15 and the ABS resin particles 16 are compressed to thereby form a packed layer comprising different kind of particles in the closed space 12. Under the above-mentioned conditions, the temperature of the recessed metal mold half is raised to 86° C. higher than a temperature which causes softening the ABS resin particles, more specifically 150° C., and the temperature of the projecting metal mold half is raised to 100° C. Then, the both metal mold halves were heated for about 20 minutes. Since the melting point of the iron particles 15 is about 1,500° C., and the shape of the iron particles is kept as they are. On the other hand, the wall portion 11 of the recessed metal mold half 7 is heated at a high temperature, and therefore, the iron particles contacting thereto are also heated at a high temperature. Accordingly, the ABS resin particles 16 in contact with the iron particle layer are molten and the molten ABS resin particles flow to surround the iron particles 15. Thus formed porous structural unit had its thickness of 10 mm wherein the fusion layer 4 in which the iron particles 15 are mixed had its thickness of about 1 mm and the porous layer 3 had its thickness of about 9 mm. The layers were integrally formed to form a laminated body. The specific gravity of the fusion layer 2 is the same as that of the ABS resin, i.e. 1.05 gr/cc when it does not contain the iron particles. However, when it includes the iron particles the specific gravity of only the fusion layer was 44 gr/cc as a result of measurement.

In case that the porous layer of the porous structural unit is used as a sound absorption material and the fusion layer is used as a sound insulation material, the sound interruption characteristic of the sound insulation material is increased as the specific gravity is large. Accordingly, the porous structural unit obtained in this Example has excellent sound interruption characteristic. In the conventional method, it was necessary to increase the thickness of the material or to attach a metallic material such as an iron plate in order to increase the sound interruption capability of a light material in specific gravity such as the ABS resin. In accordance with the method of the present invention, however, the porous structural unit with the fusion layer having a specific gravity further higher than that of the porous layer by incorporating a material having a high specific gravity at a portion to be fused.

Although the iron particles are used for particles to be mixed with the resin particles, the same effect can be obtained by using particles of another metal, glass or a material having a higher specific gravity.

Further, description has been made as to improvement of sound insulation characteristic. However, in order to obtain good electromagnetic shielding effect or heat conducting effect, a material such as aluminum effective to electromagnetic shielding may be incorporated. Further, glass fibers may be incorporated in the resin particles in order to improve the strength of the fusion layer and the porous layer.

In the above-mentioned Examples 1-1 through 3-1, the granular material is molded by the application of pressure and heat wherein a temperature difference is given to the first and second metal mold halves to thereby produce the porous layer and the fusion layer or the skin layer. However, it is possible to form a porous structural unit having such layers even by pressing the metal mold halves after the heating. This will be described hereinbelow.

At first, a small compression force (1 kg/cm$^2$ or lower) is given to the metal mold halves whereby particles are closely contacted. Then heat is applied thereto. In this condition, it is difficult to form a fusion layer or a skin layer even though there is a temperature difference between the metal mold halves, and only porous layer is produced. When the porous layer is compressed under the condition of heating which is near a temperature at the time of the completion of molding, a deformation by compression or fusion of a high temperature portion of the porous layer is accelerated, whereby a non-gas-permeable layer or a high specific gravity layer is formed in the porous layer. On the other hand, a low temperature portion in the porous layer becomes a low specific gravity layer in which a multi-cellular layer is maintained. The granular material can be mold-shaped in the same manner as the above-mentioned by utilizing a shear stress force due to a rotating or reciprocating movement of the metal mold other than the application of pressure.

EXAMPLE 4-1 of the method of preparing a porous structural unit

Now, description will be made as to a case that a porous structural unit of a cylindrical form is molded by using a granular material of thermoplastic resin as a raw material.

Figure 8:
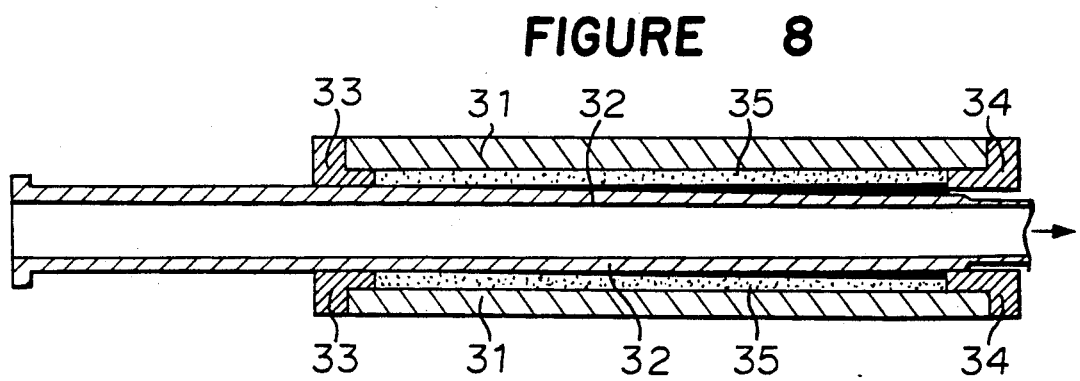
FIGS. 8 and 9 are respectively longitudinal cross-sectional views of a metal mold and a core metal mold used for another embodiment of the method of the first invention.
Figure 9:
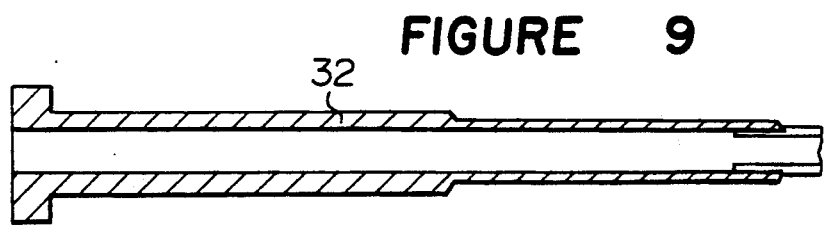

FIG. 8 is a cross-sectional view of a metal mold for explaining a method of preparing the cylindrical porous structural unit. A reference numeral 31 is a cylindrical metal mold made of aluminum, and a numeral 32 designates a core metal mold in a round rod shape of aluminum. The later has two portions having different diameters as shown in FIG. 9. Numerals 33, 34 designate covers or plugs of aluminum which are fitted to both ends of the cylindrical metal mold 31 and have openings at their central portion to allow the core metal mold 32 to pass therethrough. A closed space in which resin particles 35 are filled is formed by the cylindrical metal mold 31, the core metal mold 32 and the covers 33, 34. In the metal mold having the construction described above, the core metal mold is inserted in the cylindrical metal mold 31 so that the closed space is formed at the small diameter portion of the core metal mold 32. Then, the cover B 34 is removed, and the resin particles 35 are filled in the closed space defined by the cylindrical metal mold 31, the core metal mold 32 and the cover A 33, and thereafter, the cover B 34 is fitted to the cylindrical metal mold 31. Experiments by the inventors of this application revealed that a compression force to the resin particles 35 can not be uniformly increased even by filling resin particles 35 in volume which is larger than the volume of the closed space and by closing the cover B 34. Namely, although the resin particles 35 near the cover B 34 receive a compression force by a bridging function of the particles when the distance in the direction of compression is long, the compression force can not be transmitted to a portion far from the cover B 34. In a case of the metal mold having a substantial length as shown in FIG. 8, the compression force in the axial direction is only 1 kg/cm² or lower. Further, a distribution in compression force in the longitudinal direction rapidly changes whereby it is difficult to control the compression force. Accordingly, in this embodiment, the resin particles was filled so that the compression force at the time of closing the cover B 34 is 1 kg/cm² or lower.

The inner diameter and the outer diameter of the cylindrical metal mold were respectively 40 mm and 60 mm, and the outer diameter portions of the smaller and larger diameter portions of the core metal mold were respectively 29 mm and 31 mm. The inner diameter of the metal mold was 23 mm. The distance between the inner end surfaces of the covers A, B was 200 mm. An ABS resin particles having a diameter of 1.7 mm were filled in a manner as described before, and the metal mold was heated for about 1 hour in an electric furnace having an atmospheric temperature of 220° C. The heat capacity of the core metal mold was determined to be smaller than that of the cylindrical metal mold, and the resin particles near the core metal mold were heated at a temperature higher than that near the cylindrical metal mold. After a porous layer of the resin particles was formed by heating, the metal mold was removed from the electric furnace, and the core metal mold was drawn in the direction of arrow mark as shown in FIG. 8 before the temperature of the metal mold decreased. It was found that during the drawing of the core metal mold, the porous layer was compressed in its radial direction due to the expansion of the diameter of the core metal mold, whereby the porous layer in contact with or near the pore metal mold heated at a high temperature was formed to have a high specific gravity, and a porous structural unit having a distribution of specific gravity changing in the direction of the thickness could be obtained in the same manner as the above-mentioned Examples 1-1 through 3-1. It was further found that a shear stress was applied to the surface portion of the porous layer owing to a frictional force produced between the core metal mold and the porous layer by causing a reciprocal movement of the core metal mold in the longitudinal direction and as a result, the porous structural unit having its surface with a high specific gravity could be obtained.

It is clear that a distribution of specific gravity can be formed in the axial direction by using a core metal mold having a tapered diameter.

In the above-mentioned Examples 1-1 through 4-1, resin particles having a tubular form, a cylindrical form, a cubic form or other desired shape may be used other than the resin particles having a spherical form. Thermoplastic resin particles with needle projections are preferably used as a granular material because the needle projections are easily molten. In order to reduce the weight of the porous structural unit, a hollow granular material or a foamed granular material may be used as a raw material. Further, short fibers may be incorporated as a reinforcing material, or a thread-like thermoplastic resin material may be incorporated as a binder to the resin particles.

In order to change the specific gravity of the porous layer in the porous structural unit in the direction of the surface of the porous layer, the temperature of the metal mold at the low temperature side should be changed in the above-mentioned direction of layer surface. The specific gravity of the portion of the porous layer facing a higher temperature portion of the low temperature side metal mold becomes large, and the specific gravity of the portion facing a lower temperature portion of the metal mold becomes small. Since the above-mentioned method provides a molded porous structural unit having a one-piece structure, a porous structural unit having a complicated shape can be easily obtained by using a metal mold having the shape corresponding to the porous structural unit.

Effect of the first invention

In accordance with the method of preparing the porous structural unit of the first invention which comprises a step of putting a material including resin particles in a space formed by first and second metal mold halves, a step of imparting a temperature difference between the first and second metal mold halves, a step of pressing the material with the metal mold halves and a step of heating at least one of the metal mold halves at a temperature sufficient to softening the resin particles, a layer having a higher specific gravity at the high temperature side of the metal mold halves and a porous layer having a lower specific gravity at the low temperature side can be simultaneously and integrally mold-shaped. Accordingly, a-porous structural unit having portions whose specific gravities are different and having a complicated shape can be obtained with a low cost. Further, in accordance with the invention, the specific gravity of the surface portion of the material at the high temperature side can be easily increased by the application of a compression force or a shearing stress to the material including the resin particles while or after they are heated. The porous structural unit thus formed can be used in various ways. For instance, the layer having a higher specific gravity can be used as a structural body such as an outer frame for a machine. It reduces the number of structural elements, the number of assembling steps and so on. The porous structural unit of the present invention has high utility. For instance, it is preferably used for an acoustic absorption material, a heat insulation material, a sliding bearing, a filter unit and so on.

In accordance with the present invention, since the first and second metal mold halves have different heat capacities, a temperature difference between the both mold halves can be effectively produced.

Further, in accordance with the present invention, the bonding force between resin particles in a granular material can be strengthened by incorporating a binder in the material including the resin particles, whereby the mechanical strength of the porous structural unit can be improved.

A foamed granular material or a hollow granular material can be used as a raw material, whereby the weight of the porous structural unit can be reduced.

Further, by changing the specific gravity of the porous layer in the direction of the thickness or the surface of the porous layer, the characteristics, i.e. the acoustic absorption characteristic of the porous structural unit can be further improved.

Characteristics of the porous layer of the second invention

Various characteristics and applications of the porous layer in a porous structural unit wherein the specific gravity of the porous layer is continuously changed in the direction of the thickness or the surface of the porous layer will be described.

(i) Acoustic absorption characteristic

Figure 10:
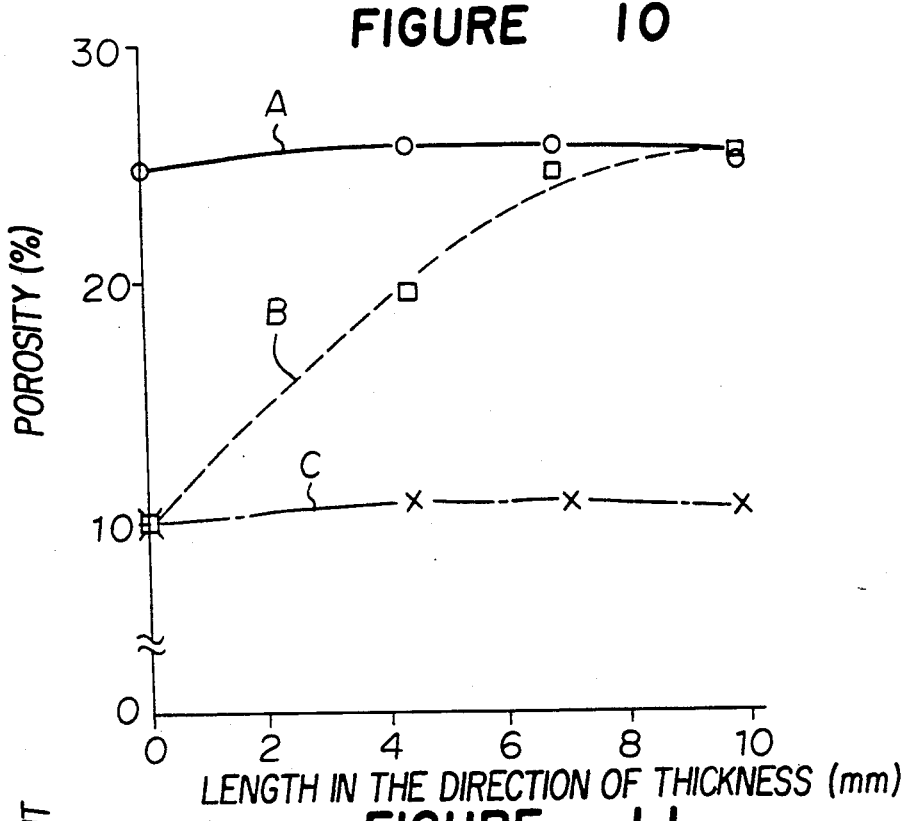
FIG. 10 is a diagram showing a relation of porosity to the thickness of the porous structural unit of an embodiment according to the second invention.

FIG. 10 is a diagram showing a distribution of porosity (specific gravity) of each of the porous structural units in the direction of the thickness of the porous structural unit (which are substantially constituted by porous layer) which have a thickness of 10 mm formed in accordance with the Example 1-1.

In FIG. 10, curved lines A and C show that each of the porosity is substantially uniform in the direction of the thickness, and that respectively have a porosity of about 25% and a porosity of about 10%. A curved line B shows that the porosity is distributed in the direction of the thickness and shows that the porosity continuously changes within a range of 10%–25%. When these porous structural units are used as an acoustic absorption material, their acoustic absorption characteristic is the most important factor.

Figure 11:
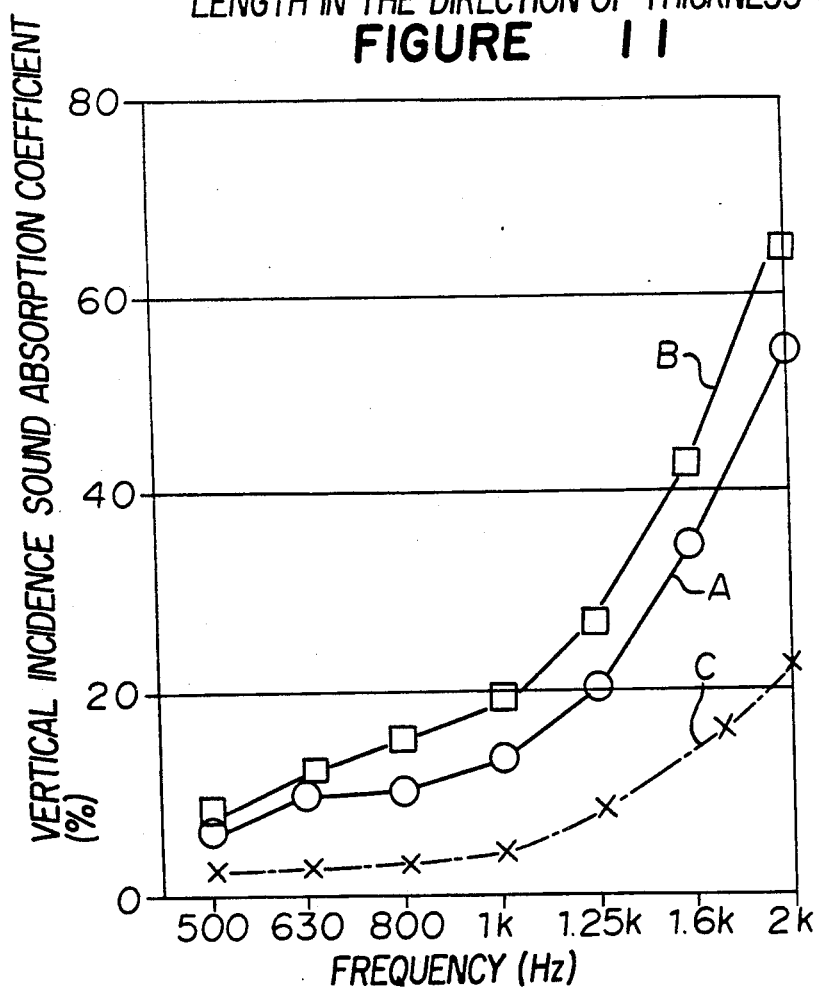
FIG. 11 is a diagram showing characteristic curves of the vertical incidence sound absorption coefficient of the porous structural units having porosity curves shown in FIG. 10.

FIG. 11 shows a result of measuring the vertical incidence sound absorption coefficient of three samples having respective porosity distributions as shown in FIG. 10 in accordance with JIS A1405 "A method of measuring the vertical incidence sound absorption coefficient of materials for buildings by a pipe method". For the sample of the curved line B having a distribution of porosity in the direction of the thickness, the side portion having a porosity of 10% is used as a surface for receiving sound waves.

As is clear from FIG. 11, it was confirmed that the sample (curved B) having a distribution of porosity exhibited the best sound absorption coefficient.

Figure 12:
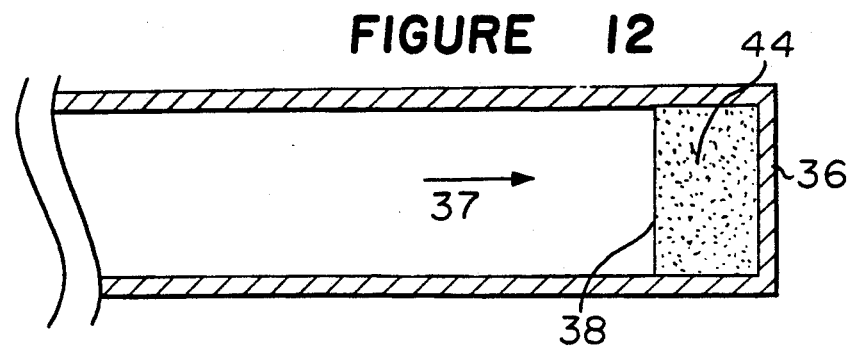
FIG. 12 is a cross-sectional view of a construction for measuring the vertical incidence sound absorption coefficient.

The reason why the porous layer having a distribution of porosity shows good result is considered as follows. In the method of measurement ruled in the above-mentioned JIS, a hard wall 36 is used for the back surface for a test piece (a porous structural unit) 44 as shown in FIG. 12. Accordingly, when sound waves 37 enter into the porous structural unit 44, a speed of particles of the sound waves 37 becomes 0 at the hard wall surface 36. The particle speed becomes large near the incident surface which is away from the hard wall surface 36, and the greatest particle speed is obtainable at the incident surface 38. The principle that sound waves are absorbed is as follows. During the propagation of sound waves in thin gaps in the porous structural unit 44, an acoustic energy is converted into a heat energy to be dissipated by the effect of viscosity to the wall surface. On the other hand, the effect of viscosity becomes remarkable as the particle speed becomes large, and the porosity at the incident surface of the porous body largely affects the acoustic absorption characteristic of the entire portion.

As described above, as the porosity becomes small, the gaps in the porous unit 44 becomes thin, whereby the effect of viscosity becomes large. However, when the porosity is too small, it is difficult that the sound waves enter into the porous unit 44 and the sound absorption coefficient decreases. In FIGS. 10 and 11, it is understood that the porosity of the sample of the curved line A is too large and the porosity of the sample of the curved line C is too small, and accordingly the optimum effect of viscosity can not be obtained. The sample of the curved line B shows that the surface for receiving sound waves (the position to obtain the greatest particle speed) of the porous unit 44 has the optimum porosity, and in addition, the porosity becomes large toward the hard wall side, whereby it is possible that the sound waves enter into the innermost portion of the porous unit 44 to thereby provide excellent acoustic absorption characteristic.

Figure 13:
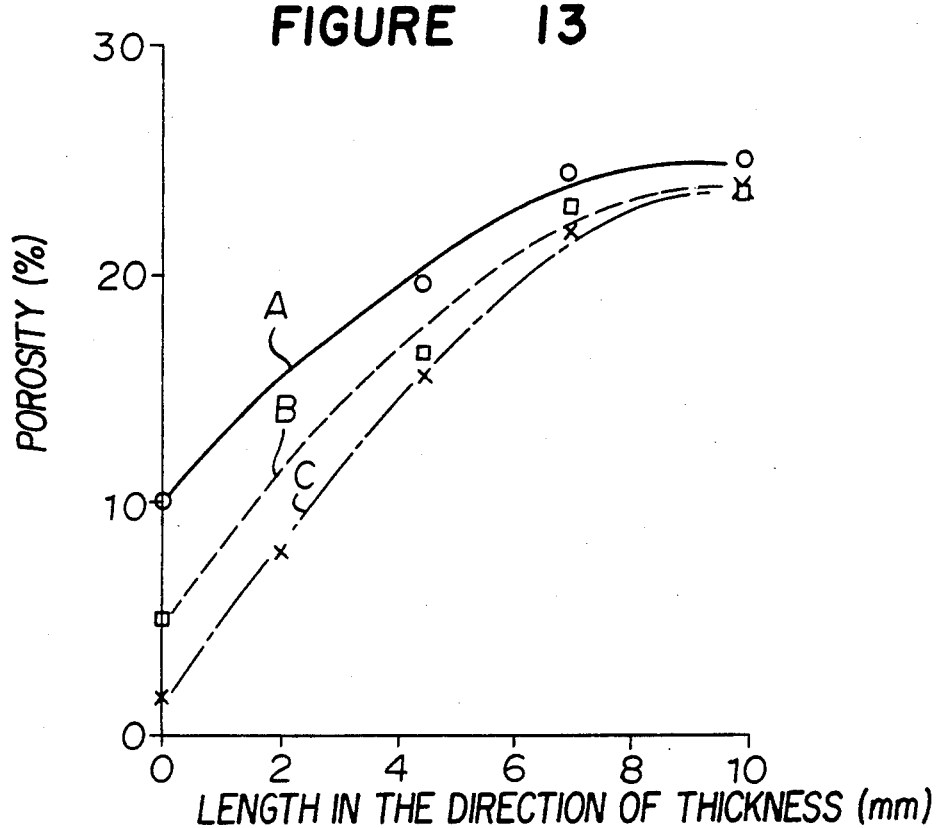
FIG. 13 is a diagram showing a relation of porosity to the thickness of the porous structural units prepared by the method of the another embodiment of the second invention.
Figure 14:
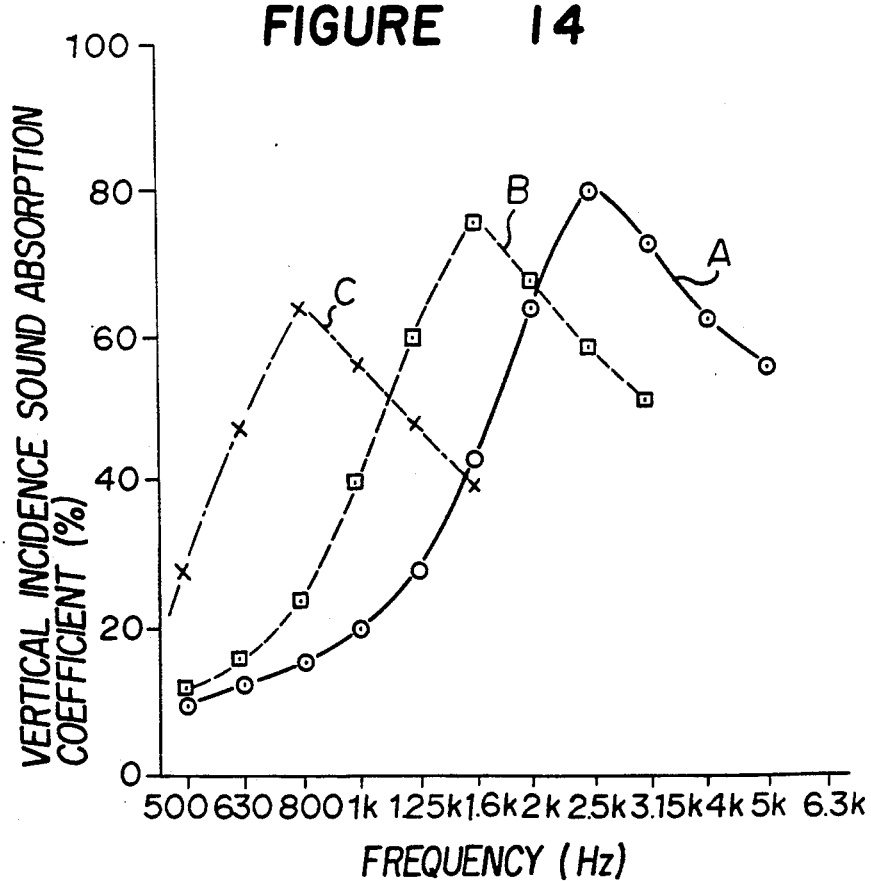
FIG. 14 is a diagram showing characteristic curves of the vertical incidence sound absorption coefficient of the porous structural units having porosity curves shown in FIG. 13.

Description will be made as to improvement in the acoustic absorption characteristic by changing the porosity (specific gravity) in the direction of the surface of the porous structural unit. FIG. 13 is a diagram showing that the porosity of three kinds of sample changes. The porosity reduces in the order of curved lines A→B→C. The acoustic absorption characteristic of each of the samples is shown in FIG. 14. In FIG. 14, when the porosity at the surface of receiving sound wave is made small (which corresponds to the curved line C), the sound absorption coefficient at a low frequency region can be increased. Accordingly, good acoustic absorption characteristic can be obtained in a broad range of frequency band regions by forming a distribution of the porosity in the direction of the surface of the porous structural unit.

The acoustic absorption characteristic of a porous structural unit having a thickness of 10 mm will be described.

Figure 15:
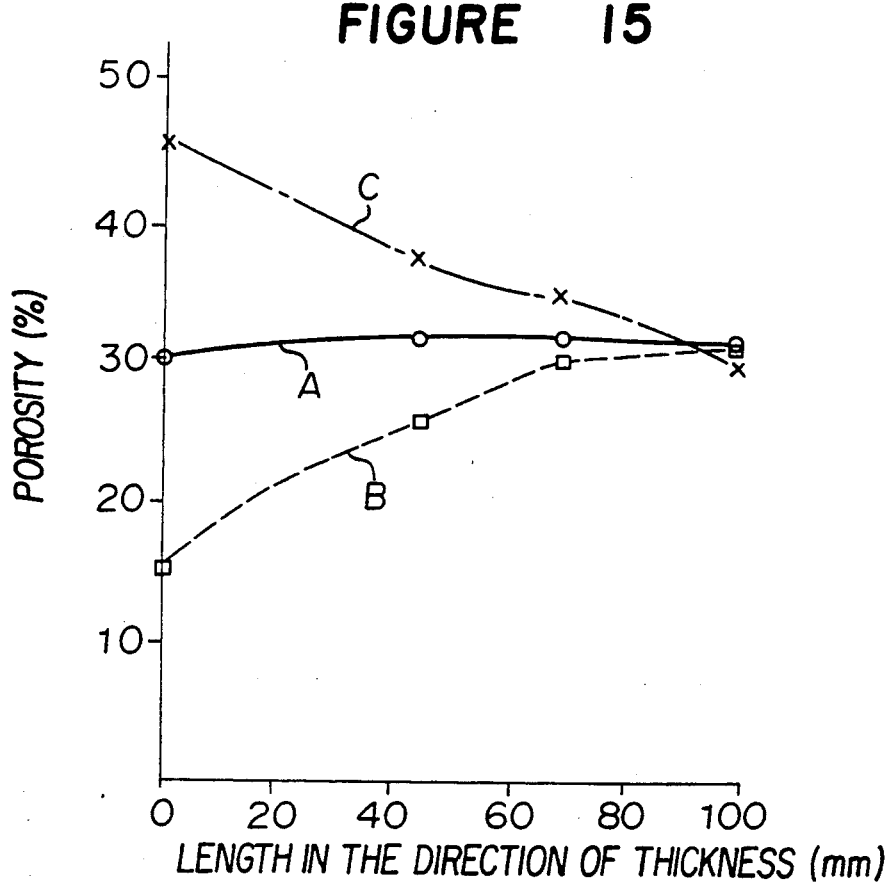
FIG. 15 is a diagram showing a relation of porosity to the thickness of the porous structural units prepared by the method of another embodiment of the second invention.
Figure 16:
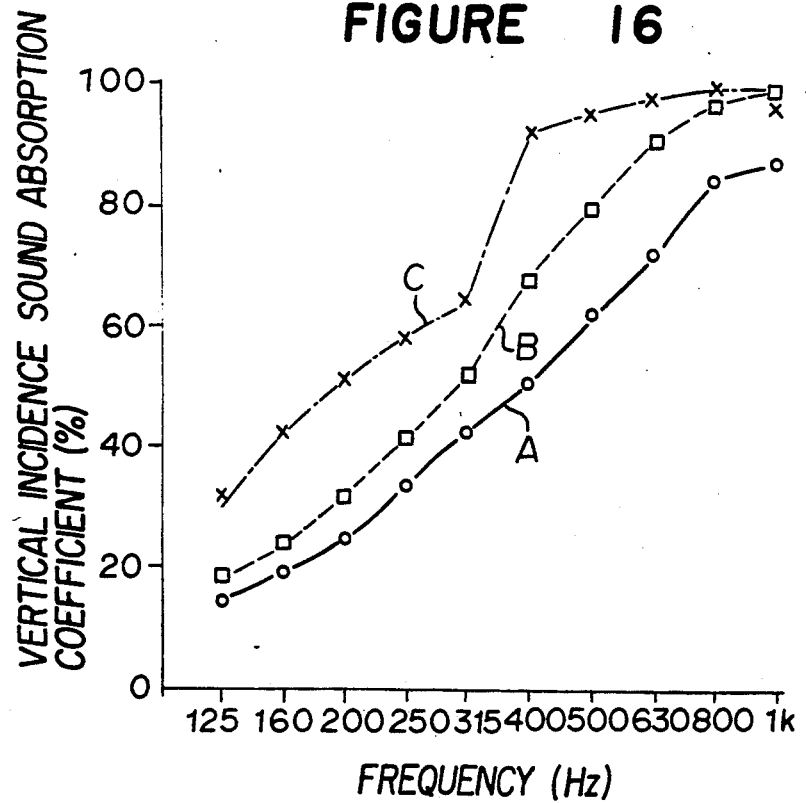
FIG. 16 is a diagram showing characteristic curves of the vertical incidence sound absorption coefficient of the porous structural units having the porosity curves shown in FIG. 15.

FIG. 15 is a diagram showing distributions of the porosity of three samples, and FIG. 16 is a diagram showing the vertical incident sound absorption coefficient of each of the samples. These Figures show that the acoustic absorption characteristic of the porous structural unit having a thickness of 100 mm exhibits the opposite characteristic to the porous unit having a thickness of 10 mm. Namely, the porous unit having a thickness of 100 mm exhibits good acoustic absorption characteristic as the porosity becomes small toward the hard wall side (curved line C). The reason is considered as follows.

In the porous unit having a large thickness, a distance for passing sound waves is long and the sound waves are reflected during propagation. Since the acoustic absorption characteristic is improved by reducing a quantity of reflection, a good result is obtainable by eliminating this continuity between the inherent acoustic impedance (the product of the density of air and a sound speed) of air through which sound waves are passed to enter the porous unit and the acoustic impedance of the porous unit. Namely, when the thickness of the porous unit is large, excellent acoustic absorption characteristic is obtainable by slightly increasing the porosity of the porous unit facing air to thereby adjust the acoustic impedance of the porous unit to the inherent acoustic impedance of air and by reducing gradually the porosity toward the hard wall side.

It was confirmed that the optimum distribution of the porosity of the porous unit changes depending on the thickness and that excellent acoustic absorption characteristic can be obtained by forming the porous unit to have a continuous change in distribution of the porosity.

(ii) Heat insulation and heat retaining characteristic

The porous structural unit has been used as a heat insulation material. It is well known that the porous unit is used to insulate heat or keep warmth because air contained in fine gaps in the porous unit transfers very small amount of heat by convection and the surface area to transmit heat of a solid which is a part of the porous unit is small whereby heat conduction ability is low.

However, the porous unit is strongly influenced by heat radiation, which substantially determines the heat insulation characteristic of the porous unit. In order to reduce heat conduction by radiation, an aluminum layer was attached to the surface of heat insulation material to prevent radiant rays from entering in the porous unit. However, in the conventional technique, productivity was poor and there was further problem of a short lifetime due to the peeling-off of the aluminum layer. Further, there has been proposed to reduce the porosity of the porous unit to thereby improve heat conduction by radiation. However, when the porosity is made small, the heat conduction becomes large, and accordingly, it is not effective to improve heat insulation-heat retaining characteristic as a whole.

In the porous structural unit according to the second invention, the porosity (specific gravity) is changed. A degree of changing the porosity can be selected as desired depending on usage. Accordingly, radiant rays can be interrupted at the surface portion and heat conduction can be small by making the porosity small at the area near the surface portion and by making the porosity large in the porous unit. Thus, a porous unit having excellent heat. insulation-heat retaining characteristic can be obtained.

(iii) Oil containing bearing (sliding bearing)

An oil containing bearing is formed by impregnating a lubricating oil in a porous material and adapted to supply oil without the necessity of an external supply of oil. Further, it is inexpensive. Accordingly, it is widely used in a field that a load to the bearing is small.

Generally, in a forcibly oil-feeding type sliding bearing, an oil pressure of about 20 kg/cm$^2$ is produced in an oil film at the sliding surface when a shaft is rotated; this raises the shaft and there occurs a so-called complete lubrication (liquid lubrication) wherein the shaft does not directly contact with the bearing.

On the other hand, in the oil containing bearing, even when an oil pressure is produced, a part of the oil pressure escapes outside through the porous wall of the bearing to thereby reduce the oil pressure, whereby a so-called boundary lubrication wherein the shaft is locally contact with the bearing is performed. Accordingly, the friction coefficient of the oil containing bearing is as high as 0.1-0.2 in comparison with a case of the forcibly oil-feeding type bearing having a friction coefficient of 0.02-0.05. The temperature rise in the oil containing bearing is relatively high.

The allowable load of the oil containing bearing can be improved by increasing the pressure of oil film at the sliding surface. For this purpose, a method wherein a stream of oil is produced through a porous wall without causing reduction of the oil pressure has been studied. For instance, there has been proposed a method wherein the surface portion of a bearing is constituted by a layer having pores of a small diameter and the oil retaining portion is constituted by a layer having pores of a large diameter. Namely, a lining layer having pores of a small diameter is bonded to the oil retaining layer. The lining layer prevents the oil pressure from decreasing. Such method is disclosed in, for instance, "oilless bearing" (by Kawasaki, published by the AGNE, P. 87). However, the proposed method has a problem that pores are discontinuous at connecting portion of the two layers, and a self-oil-feeding resistance from the oil retaining layer to the lining layer becomes large, whereby improvement of the bearing load is not sufficient.

On the other hand, in accordance with the porous structural unit of the second invention, the diameter of pores in the porous layer for the bearing is made minimum at the surface portion of the bearing and the diameter of the pores is made continuously or gradually increased toward the bottom portion. Accordingly, the pressure of the oil film can be increased, a suitable amount of oil can be retained, and excellent performance can be obtained.

(iv) Filter material

The porous structural unit of the second invention can be used as a filter. By using the structure wherein the diameter of pores (porosity) is continuously changed, dust in air can be removed in a continuous manner while reducing a possibility of causing clogging, and efficiency of catching the dust is increased. A compact single body type filter unit can be formed by using a layer having pores of small diameter for the outside layer of the filter.

The porous structural unit having a porous layer wherein the porosity (specific gravity) is continuously changed can be utilized widely by taking an advantage that a complicated shape and a complicated material can be used.

As the resin particles for constituting the porous layer, particles having a spherical shape are used in the above-mentioned Examples. However, resin particles of a tubular form, a cylindrical form, a cubic form or another suitable form may be used. Thermoplastic resin particles with needle-like projections can be preferably used because the needle-like projections are easily molten. Further, in order to reduce the weight of the porous layer, a hollow granular material produced by foaming or a foaming granular material may be used. Short fibers may be mixed with resin particles. Further, a thread-like thermoplastic resin may be incorporated as a binder.

It was found that further excellent characteristics, especially the acoustic absorption characteristic could be obtained by suitably selecting the shape and the longer diameter of the granular material used for the porous unit. Description will be made as follows.

Figure 17:
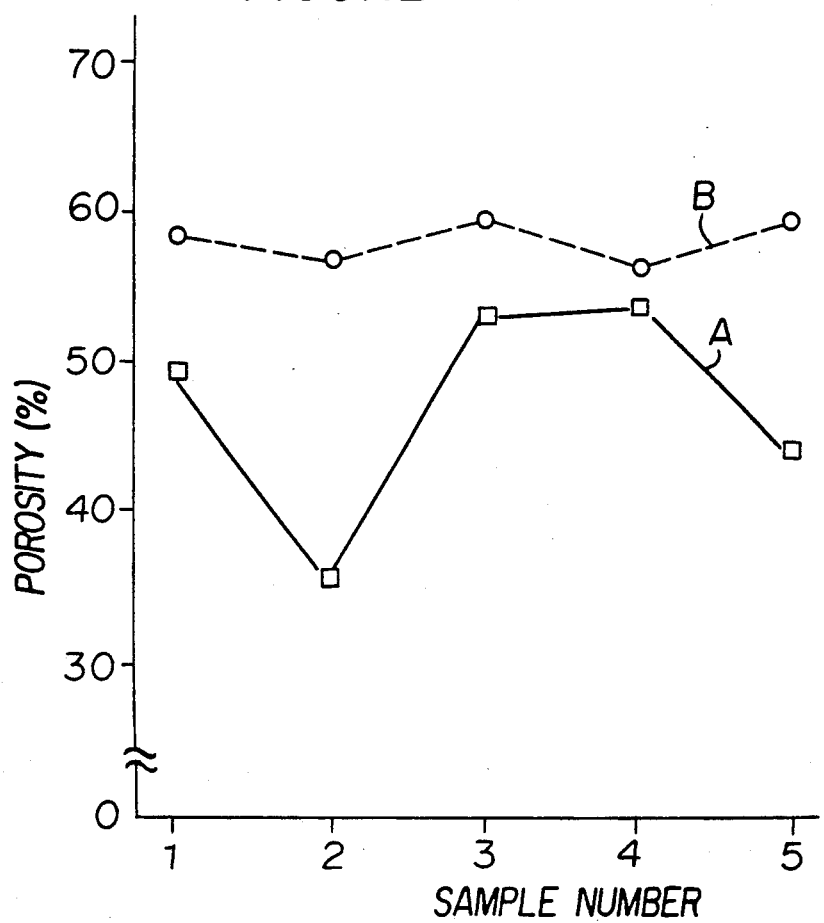
FIG. 17 is a diagram showing fluctuation in the vertical incidence sound absorption coefficient when the shape of the granular material constituting the porous layer of porous structural units.

FIG. 17 is a diagram showing fluctuation in the vertical incidence sound absorption coefficient of five samples in a case that the shape of granular material is changed. A curved line A is for a sample made of a granular material of a cylindrical form wherein the diameter is 0.8 mm and the length is 1 mm, and a curved line B is for a sample made of a granular material of a spherical form wherein the diameter is 1 mm. The thickness of the porous layer of the samples is 10 mm and a frequency of 2 KHz is used to measure the sound absorption coefficient. In FIG. 17, it is understood that the curved line B using the spherical resin particles shows that there is a small difference in the characteristic of the samples and very stable. The reason is that a granular material in a spherical form comes to contact with another at only one point and therefore, the state of the layer of the spherical particles is uniform in the molded product. Thus, by using spherical (or elliptic) particles, a further preferable porous structural unit can be obtained in a case that stableness in the characteristics among samples is required.

Figure 18:
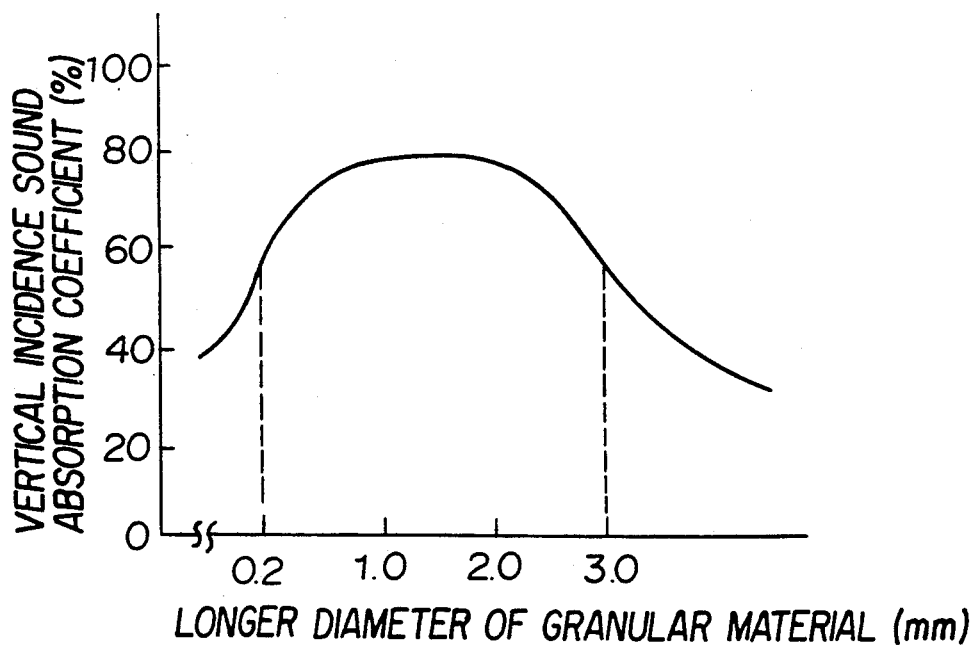
FIG. 18 is a diagram showing a relation of sound absorption coefficient to the diameter of the granular material.
Figure 19:
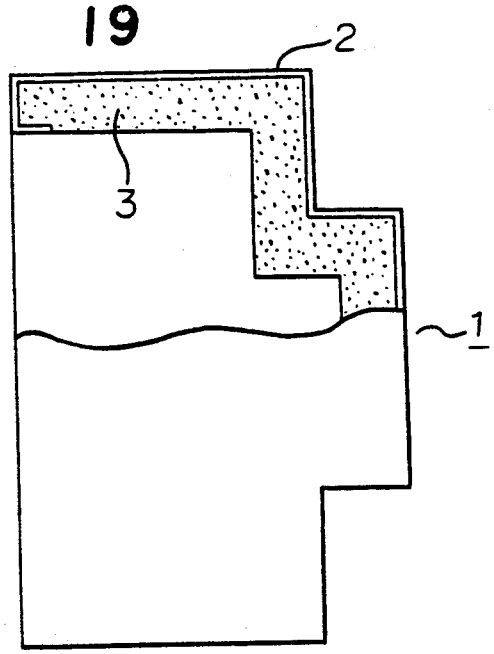
FIG. 19 is a side view partly cross-sectioned of a porous structural unit having a layered structure according to the second invention.

Further, it was found that the acoustic absorption characteristic depended on the longer diameter of a granular material. FIG. 18 is a diagram showing the relation of the longer diameter of a granular material to the sound absorption coefficient of a product formed by using the granular material. The thickness of a sample is 10 mm and a frequency used for measurement is 2 KHz. When the diameter of the granular material is too small or too large, it is difficult that sound waves enter into the porous material, or the inherent acoustic impedance of the porous material does not coincident with the inherent acoustic impedance of air to thereby reduce the sound absorption coefficient. With respect to FIG. 18, it was found that the acoustic absorption characteristic could be improved by determining the longer diameter of the granular material to be in a range of 0.2-3.0 mm for practical use, preferably, 1.0-2.0 mm.

Another Example of the porous structural unit according to the second invention will be described. The porous structural unit comprises a porous layer wherein the specific gravity is continuously changed in the direction of the thickness or the surface of the layer and a solid layer having a porosity smaller than that of the porous layer and a specific gravity greater than the porous layer, the porous layer and the solid layer being laminated. When a thermoplastic resin particles are used as a raw material for the solid layer, it becomes a fusion layer. The solid layer can be gas-permeable or non-gas-permeable depending on a degree of fusion. When a thermosetting resin particles are used as a material for the solid layer, the solid layer becomes a layer having a higher specific gravity because the granular material is softened and is bonded with a binder. In this case, the solid layer can be gas-permeable or non-gas-permeable depending on a degree of the softening of the granular material.

(i) Porosity

Figure 20:
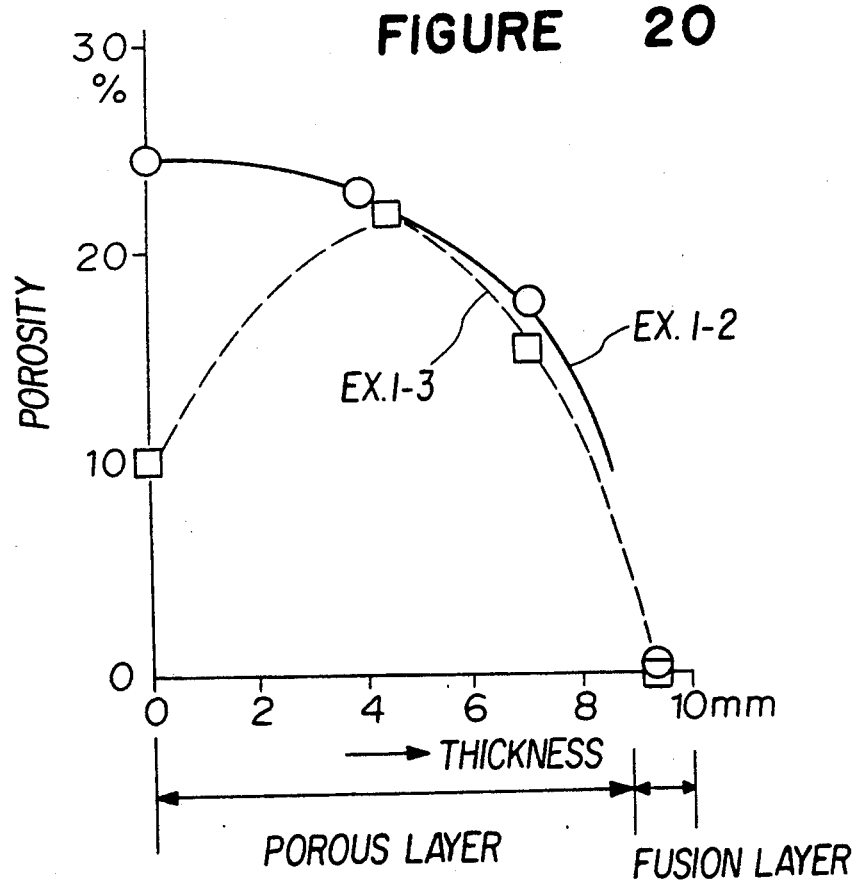
FIG. 20 is a diagram showing a relation of porosity to the thickness of the porous structural units prepared by the method according to the first invention.

FIG. 20 is a diagram showing the porosity of a mold-shaped porous structural unit wherein curved lines (Ex. 1-2 and Ex. 1-3 respectively indicate a relation of the porosity (%) to the thickness (mm) of the porous structural units prepared according to Examples 1-2 and 1-3. The fusion layer 2 of the porous structural units is non-gas-permeable. The porous layer of Ex. 1-2 is so formed that the porosity is continuously changed in the direction of the thickness, and the porosity is greatest at the surface portion (low temperature side) the porous layer 3 of Ex. 1-3 is so formed that the porosity is continuously changed in the direction of the thickness, and the porosity is greatest at the central portion of the porous layer 3 while the porous layer is low at the surface portion (low temperature side). Namely, the porosity at the surface portion is between the greatest porosity of the porous layer 3 and the porosity of the fusion layer 2. This shows that a partially fused skin layer 4 is formed. When the same material is used, the specific gravity is large as the porosity is small.

(ii) Characteristics of layered porous structural unit

Figure 21:
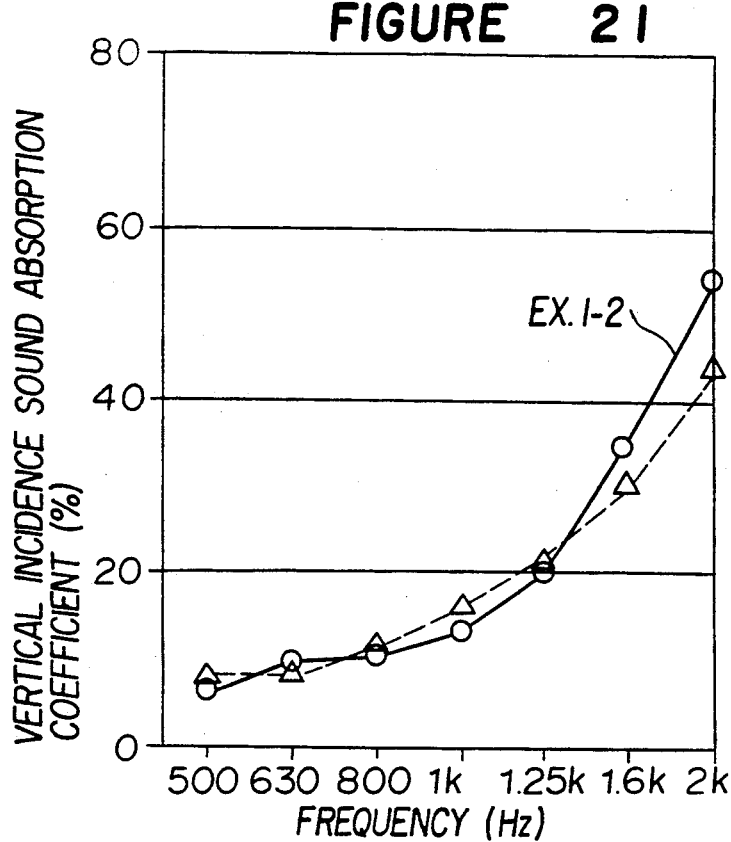
FIG. 21 is a diagram for comparing the vertical incidence sound absorption coefficient of the porous structural unit having the porosity curve shown in FIG. 20 with that of a conventional porous structural unit.

When a porous structural unit is used for a sound absorption material, the acoustic absorption characteristic becomes a problem. FIG. 21 is a diagram for comparing the vertical incidence sound absorption coefficient wherein the vertical incidence sound absorption rate is obtained in accordance with the before-mentioned JIS A1405. A curved line Ex. 1-2 is for the porous structural unit having a thickness of 10 mm prepared according to Ex. 1-2 and a broken line is for a conventional porous structural unit having a thickness of 10 mm in which urethane form is used for a sound absorption material. It is found from FIG. 21 that the vertical incidence sound absorption coefficient of the porous structural unit formed by the method of Ex. 1-2 had the characteristic equivalent to or superior to that of the conventional unit.

Figure 22:
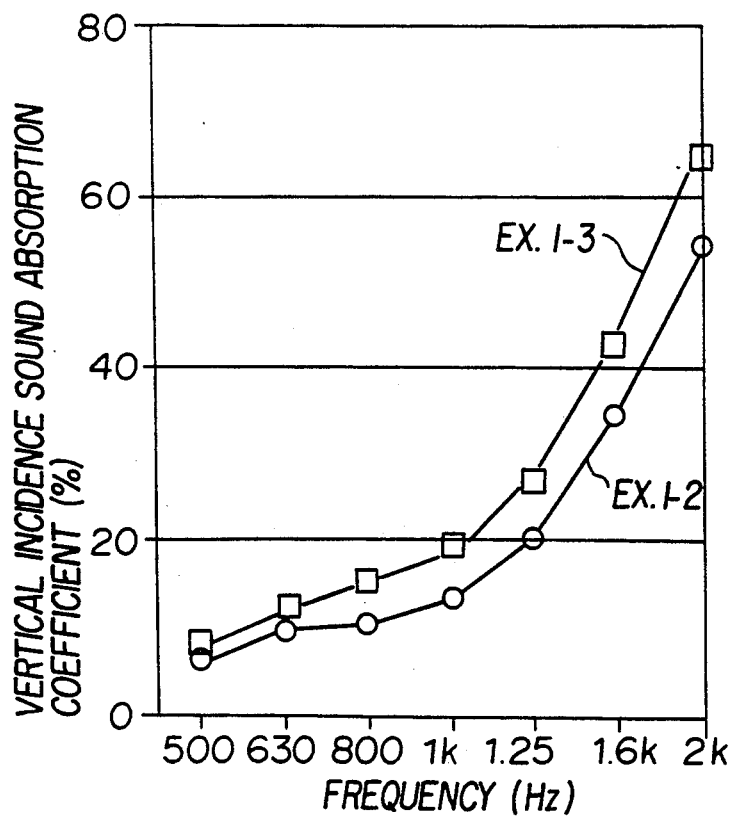
FIG. 22 is a diagram showing a relation of the vertical incidence sound absorption coefficient of the porous structural units prepared by the method of the present invention to frequency.

FIG. 22 is a diagram showing the vertical incidence sound absorption coefficient similar to that of FIG. 21. Curved lines Ex. 1-2 and Ex. 1-3 are respectively for the porous structural units with a porous layer having a thickness of 10 mm which are formed in accordance with the method of Example 1-2 and 1-3. In FIG. 22, the reason why Ex. 1-3 shows a good result seems that the porosity at the surface portion is suitably provided.

(iii) Effect of skin layer

Description will be made as to clarification of a phenomenon wherein the acoustic absorption characteristic is improved by a skin layer and the optimum thickness of the skin layer.

An ABS resin was used as a raw material for the porous layer, and a sample of the porous layer having a thickness of 10 mm was prepared in accordance with the method of the above-mentioned Example 1-1.

Figure 23:
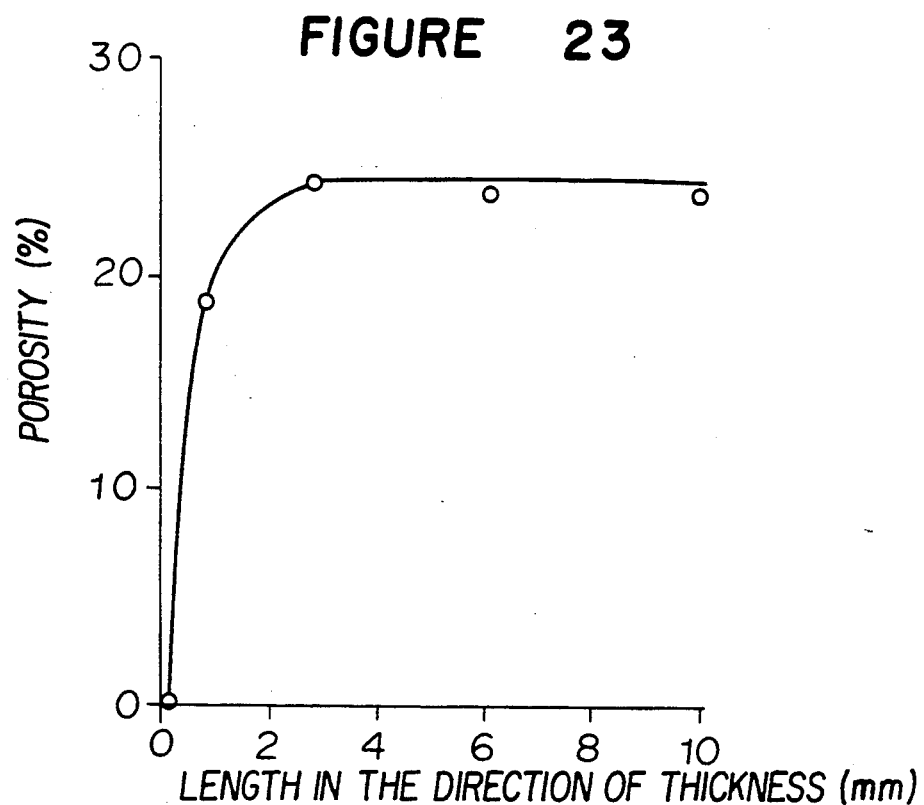
FIG. 23 is a diagram showing the porosity of a porous structural unit having a skin layer according to the present invention.
Figure 24:
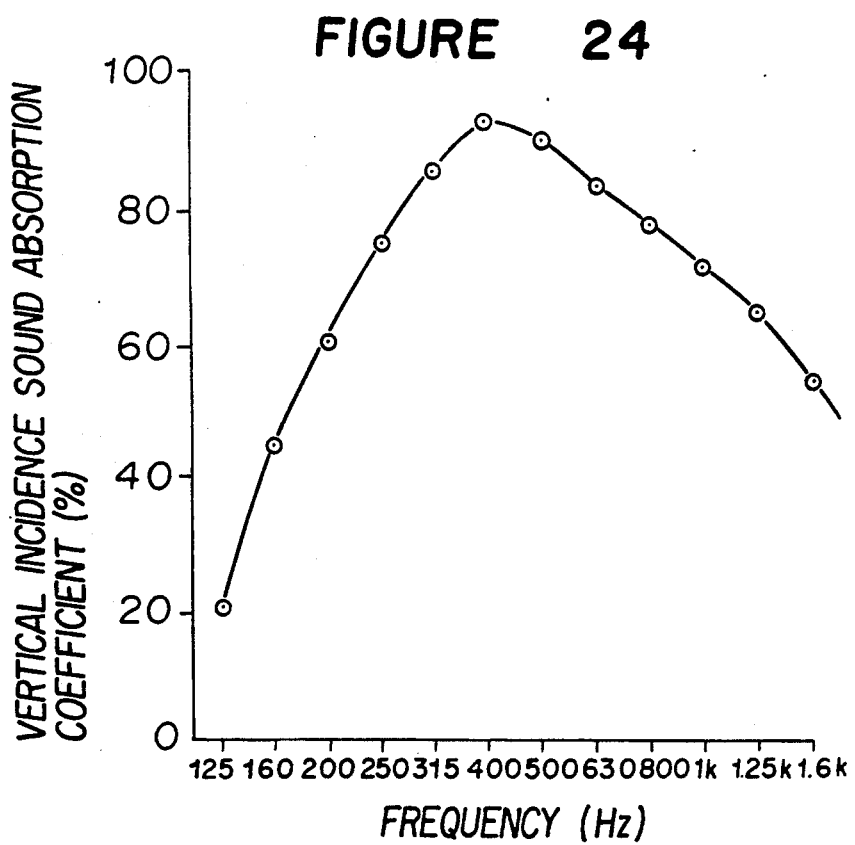
FIG. 24 is a diagram showing characteristic curve of the vertical incidence sound absorption coefficient of the porous structural unit with the skin layer having the porosity curve shown in FIG. 23.

FIG. 23 is a diagram showing a result of measurement of the distribution of the porosity of the sample, and FIG. 24 is a diagram showing a relation of the vertical incidence sound absorption coefficient to frequency wherein the side having small porosity of the porous material is used as the surface for receiving sound waves. As is clear form the Figures, the sample showed the greatest sound absorption coefficient at a low frequency of 400 Hz wherein the greatest sound absorption coefficient exceeded 90% which is an excellent characteristic. A rupture cross-section of the sample was observed with a microscope to examine the porosity of the surface for receiving sound waves. As a result, a skin layer of substantially non-gas-permeable having a thickness of about 30 $\mu$m at the surface portion was found.

The above-mentioned phenomenon will be described with reference to an acoustic model as shown in FIG. 25. The acoustic impedance (denoted by a character Z) of the porous structural unit is expressed by the following equation (1):

$$Z = r_n + j\omega m_n + \frac{\rho^* C^{*2}}{j\omega l} + J\omega m \qquad (1)$$

where $r_n$ acoustic resistance of the porous layer 3, $\omega$ is angular velocity, $m_n$ is the inertance of air of the porous layer 3 and l is the thickness of the porous layer 3, $\rho^*$ is equivalent density of air in the porous layer 3, $C^*$ is equivalent sound speed of air in the porous layer 3 and m is surface density of the skin layer 4.

In order to obtain a frequency wherein the sound absorption coefficient assumes the greatest value, the complex component in the equation (1) has to be 0. The frequency f is obtainable from the following equation (2).

$$f = \frac{1}{2\pi} \cdot \sqrt{\frac{\rho^* C^{*2}}{(m_n + m)l}} \qquad (2)$$

Since the surface density m of the skin layer is far greater than the inertance $m_n$ of the porous layer, the frequency f at which the greatest sound absorption coefficient can be obtained can be greatly reduced to a low frequency region by providing the skin layer, as is clear from the equation. Since the sound absorption coefficient of the porous layer is low at a low frequency region, the provision of the skin layer is effective to improve the characteristic. Although it has been well known to obtain such effect by providing the skin layer, there has been known that the skin layer is attached to the porous material. Although reduction of the frequency for obtaining the greatest sound absorption coefficient can be attained by attaching the skin layer to the porous material, the absolute value of the sound absorption coefficient is reduced to 80% or lower. The reason can be considered as follows.

The acoustic impedance Z at the frequency region to obtain the greatest sound absorption coefficient is expressed as follows from the equation (1):

$$Z = r_n$$

As is well known, when $r_n = \rho C$ (where $\rho$ and C are respectively the density and the sound speed of air), the sound absorption coefficient becomes 100%. However, the conventional method of attaching the skin layer increases a component of resistance at the bonding portion between the skin layer and the porous material. When the component of resistance is inserted in series to the acoustic resistance of the porous material, the above-mentioned equation $r_n = \rho C$ can not be satisfied and fluctuation in the characteristic may result due to unstableness derived from the bonding of the both materials.

On the other hand, the present invention eliminates the above-mentioned problem by mold-shaping the skin layer and the porous layer in one piece.

Several porous structural units were prepared by changing the thickness of the skin layer, and sound absorption characteristic was examined for each of the porous structural units. As a result, when the thickness of the skin layer exceeds 100 μm, the skin layer acts as an elastic layer (as a spring) but not mass, and the frequency corresponding to the greatest sound absorption coefficient rises on the contrary. Accordingly, it was found that 100 μm or lower was appropriate.

So far, the porous structural unit having a two-layered structure has been described. However, a porous structural unit having three or more layers may be used.

Figure 26:
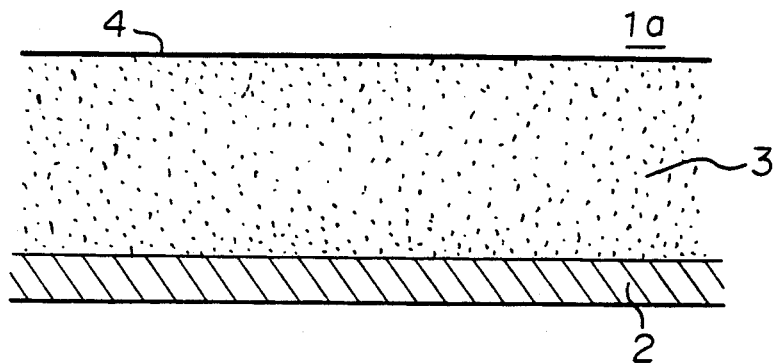
FIG. 26 through 28 are respectively diagrams showing porous structural units having layered structures according to the second invention.

FIG. 26 is a cross-sectional view of a porous structural unit 1a having a three-layered structure which comprises a skin layer 4, a porous layer 3 and a non-gas-permeable solid layer 2. As described before, since the laminated structure of the skin layer 4 and the porous layer 3 has excellent sound absorption characteristic and the non-gas-permeable solid layer 2 is excellent sound shielding material, the porous structural unit can be used as a structural material performing both function of sound absorption and sound shielding.

When it is used as a heat insulation-heat retaining material, the skin layer 4 serves as a radiant ray insulating material, the porous layer 3 serves as a heat conduction insulating material and the solid layer 2 serves as a casing for a machine to be received therein.

Figure 27:
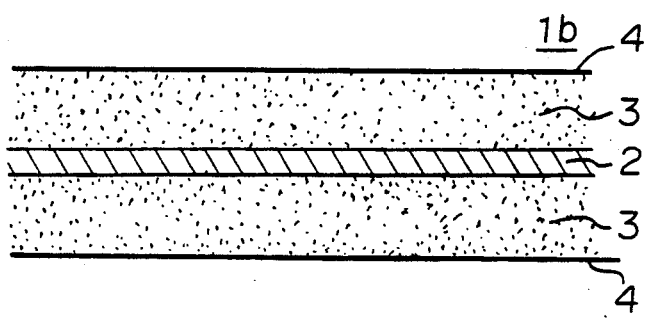
Figure 28:
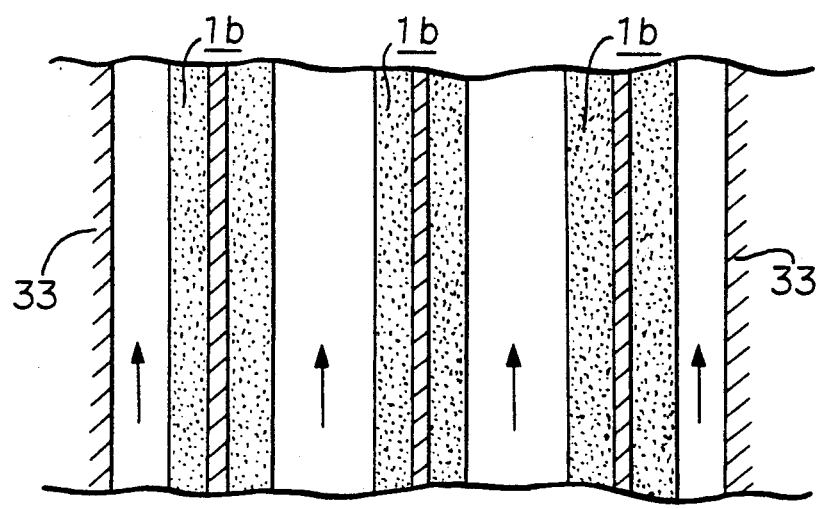

FIG. 27 is a diagram showing another embodiment of the porous structural unit 1b wherein a solid layer 2 is sandwiched between two sets of a porous layer 3 and a skin layer 4. The porous structural unit 1b can be applied to a split type or a gel type sound deadening device. FIG. 28 is a diagram showing an embodiment of the sound deadening device wherein a plurality of the structural units 1b are arranged so as to divide the inside of a duct 33 into a plurality of sections. The split (cell) type sound deadening device has excellent sound deadening performance at a low frequency. Beside of the above-mentioned embodiment, the porous structural unit of the present invention can be used in various fields and various number of layers and various kinds of material can be applied to the porous structural unit of the present invention.

Particles other than resin particles may be used for the granular material constituting the porous structural unit of the present invention to obtain sufficient function. An Example of the method of preparing the porous structural unit is described the above-mentioned Example 3-1.

Characteristics (sound shielding characteristic)

FIG. 30 is a diagram showing the sound shielding characteristic of the porous structural unit of the present invention wherein a curved line Ex. 1-2 shows the sound shielding characteristic of the porous structural unit (without including iron particles) having a thickness of 10 mm prepared according to the method as in Example 1-2 and a curved line Ex. 3-1 shows the sound shielding characteristic of the porous structural unit (including iron particles) having a thickness of 10 mm prepared by the method as in Example 3-1. These sound shielding characteristics were measured by using a characteristic measuring device as shown in FIG. 29. The porous structural unit 1 was put in a pipe body (having a diameter of 100 mm) 39. Microphones 40, 41 were arranged at both sides of the porous structural unit 1. Sounds were generated from a speaker 42 placed at one side of the pipe body 39. The other end of the pipe body 39 was closed and glass wool 43 was packed at the closed end so as to have a length of about 100 mm so that the sounds were reflected at the closed end. An acoustic pressure level of the sounds entering in the porous structural unit was measured by the microphone 40. An acoustic pressure level of the sound waves transmitting through the porous structural unit was measured by the microphone 41. A degree of sound shielding (dB) of the porous structural unit was evaluated with a value obtained by subtracting the sound pressure level of the transmitting sound waves from the sound pressure level of the incident sound waves.

FIG. 30 shows improvement of a sound shielding degree of about 10% by Ex. 3-1 (including iron particles) over Ex. 1-2 (without iron particles) in the above-mentioned Example.

The case that iron particles are incorporated in resin particles has been described. However, the same effect can be obtained by using another metal or glass which has a higher specific gravity. Further, although description has been made as to improvement of the sound shielding characteristic, a material such as aluminum may be incorporated to improve electromagnetic shielding characteristic and heat conduction characteristic. In addition, glass fibers may be incorporated in the resin particles in order to improve the strength of the fusion layer and the porous layer.

Effect of the porous structural unit of the second invention

In accordance with the second invention, the porous structural unit having excellent sound absorption characteristic and heat insulation characteristic can be obtained since it has the porous layer in which the specific gravity of the porous layer is continuously changed in the direction of the thickness or the surface of the layer.

In the second invention, the granular material constituting the porous layer in which the specific gravity is gradually changed is spherical or elliptic particles is used, and the diameter or the longer diameter is in the range of 0.2-3.0 mm. Accordingly, the characteristics can be further improved and a stable characteristics can be obtained.

Further, in accordance with the second invention, the porous layer in which the specific gravity is changed and the solid layer having a porosity smaller than that of the porous layer are laminated wherein the solid layer is melt-bonded with the porous layer through the fusion layer, and the fusion layer is made non-gas-permeable, whereby the sound absorption characteristic and other characteristics can be improved. In this structure, since the boundary of the layers is melt-bonded, various types of material can be used for the porous structural unit.

In the second invention, a plurality of the porous layers 2 in which the specific gravity is changed and the solid layers are combined, whereby the porous structural unit having such combination can be used for various fields.

Further, the skin layer having the thickness of 100 $\mu$m or less is formed in the solid layer, whereby the sound absorption characteristic and the heat insulation characteristic of the porous structural unit can be improved.

Further, the solid layer having a porosity smaller than the porous layer is attached to one side surface of the porous layer in which the specific gravity is changed, and the skin layer having a thickness of 100 $\mu$m or less is attached to the other side surface of the porous layer, whereby the characteristics can be further improved, and in some case the porous structural unit having the construction can be used for a casing for a machine.

In the second invention, since the granular material constituting the porous layer in which the specific gravity is changed is constituted by a plurality of different shapes and materials, functions as the porous structural unit can be expanded.

We claim:

1. A sound absorbing porous structural unit having a porous layer in which the specific gravity is continuously changed in the direction of the thickness of said layer, wherein one side surface of said porous layer is attached with a solid layer having a porosity lower than that of said porous layer, and the other side surface of said porous layer is mold shaped with a skin layer having a thickness of 100 $\mu$m or less.

2. The porous structural unit according to claim 1, wherein a granular material constituting the porous layer is spherical or elliptical.

3. The porous structural unit according to claim 2, wherein the length of the major axis of the granular material is in a range of 0.2-3.0 mm.

4. The porous structural unit according to claim 1, wherein said solid layer is a fusion layer and is fuse-bonded to said porous layer.

5. The porous structural unit according to claim 4, wherein said fusion layer is non-air-permeable.

6. The porous structural unit according to claim 1, wherein a plurality of the porous layers and the solid layers are combined.

7. The porous structural unit according to claim 1, wherein different shapes or materials are used for a granular material constituting said porous layer.

* * * * *